(12) United States Patent
Sharma et al.

(10) Patent No.: US 7,295,511 B2
(45) Date of Patent: Nov. 13, 2007

(54) SYSTEM AND METHOD FOR PACKET DATA SERVING NODE LOAD BALANCING AND FAULT TOLERANCE

(75) Inventors: Abhishek Sharma, Mt. Prospect, IL (US); Michael S. Borella, Naperville, IL (US)

(73) Assignee: UTStarcom, Inc., Alameda, CA (US)

( * ) Notice: Subject to any disclaimer, the term of this patent is extended or adjusted under 35 U.S.C. 154(b) by 973 days.

(21) Appl. No.: 10/170,900

(22) Filed: Jun. 13, 2002

(65) Prior Publication Data
US 2003/0235168 A1 Dec. 25, 2003

(51) Int. Cl.
*G01R 31/08* (2006.01)
(52) U.S. Cl. .................. 370/217; 370/328; 370/400
(58) Field of Classification Search .................... None
See application file for complete search history.

(56) References Cited

U.S. PATENT DOCUMENTS

| | | | |
|---|---|---|---|
| 6,137,791 A | 10/2000 | Frid et al. | |
| 6,501,746 B1 | 12/2002 | Leung | |
| 6,580,699 B1 * | 6/2003 | Manning et al. | 370/331 |
| 6,674,713 B1 * | 1/2004 | Berg et al. | 370/217 |
| 6,980,534 B1 * | 12/2005 | Nee et al. | 370/329 |
| 6,985,464 B2 * | 1/2006 | Harper et al. | 370/331 |
| 2002/0031107 A1 | 3/2002 | Li et al. | |
| 2002/0114323 A1 | 8/2002 | Chowdhury et al. | |
| 2002/0145990 A1 * | 10/2002 | Sayeedi | 370/335 |
| 2002/0167905 A1 * | 11/2002 | Wenzel et al. | 370/249 |
| 2003/0054824 A1 * | 3/2003 | Choi et al. | 455/436 |
| 2005/0025116 A1 * | 2/2005 | Chen et al. | 370/349 |

FOREIGN PATENT DOCUMENTS

JP  2002-084563  3/2002

* cited by examiner

*Primary Examiner*—Chau Nguyen
*Assistant Examiner*—Jung Park
(74) *Attorney, Agent, or Firm*—McDonnell Boehnen Hulbert & Berghoff LLP

(57) ABSTRACT

A system and methods are shown for providing packet data serving node (PDSN) load balancing and fault tolerance. One exemplary method includes providing an access node with a plurality of packet data serving nodes and at least one system manager, receiving from a radio node on a first packet data serving node a registration request, determining that the first packet data serving node is unable to serve the registration request, and sending a packet data serving node selection request from the first packet data serving node to the system manager. The method further includes determining at the system manager a second packet data serving node to serve the registration request, and providing an address of the second packet data serving node to the first packet data serving node. The method further includes sending a registration reply message from the first packet data serving node to the radio node, where the registration reply message includes the address of the second packet data serving node.

21 Claims, 15 Drawing Sheets

SYSTEM AND METHOD FOR PACKET DATA SERVING NODE LOAD BALANCING AND FAULT TOLERANCE

FIELD OF THE INVENTION

The present invention relates to communications in mobile Internet Protocol ("IP") networks. More particularly, it relates to load balancing of packet data serving nodes and packet data serving nodes redundancy with failover capabilities.

BACKGROUND OF THE INVENTION

Public packet switched networks can be used to carry traffic to and from a mobile communications device (a mobile node), such as a mobile host, or a router that changes its point of attachment from one network to another. The basic architecture of mobile IP data networking is known in the art and described in several publications, including the Request for Comments ("RFC") document RFC 2002 (1996) (hereinafter "RFC 2002"), which is currently available from the Internet Engineering Task Force ("IETF") at www.ietf.org for more information. Persons skilled in the art of mobile IP data networking are familiar with that document and devices used to implement mobile IP data networking in practice.

In a mobile IP communication network, a mobile node communicates with a target host on an IP network by means of two devices, a "foreign agent" and a "home agent". One example of a mobile IP network that describes that type of communication is presented in U.S. patent application Ser. No. 09/354,659 entitled "Mobile Internet Protocol (IP) Networking with Home Agent and/or Foreign Agent Functions Distributed Among Multiple Devices," the entire content of which is incorporated herein by reference. Typically, the foreign agent functionality is incorporated into a router on a mobile node's visited network. The foreign agent provides routing services for the mobile node while it is registered with the home agent. For example, the foreign agent de-tunnels and delivers datagrams that were tunneled by the mobile node's home agent to the mobile node.

The home agent is typically incorporated into a router on a mobile node's home network. The home agent maintains current location information for the mobile node. When one or more home agents are handling calls for multiple mobile nodes simultaneously, the home agents are providing, in essence, a service analogous to a virtual private network service. Each mobile node is typically associated with a separate home network and the routing path from that home network, through the home agent, to the foreign agent and mobile node is like a virtual private network for the mobile node.

Mobile IP requires link layer connectivity between a mobile node (a mobile entity) and a foreign agent. However, in some systems, the link layer from the mobile node may terminate at a point distant from the foreign agent. Such networks are commonly referred to as third generation wireless networks. FIG. 1 is a block diagram illustrating a network architecture that is typically employed in the third generation wireless networks. Referring to FIG. 1, a mobile node 10 communicates with a target host 34 on an IP network 30 by means of three devices, a radio network node 16, a packet data serving node 18, and a home agent node 24. The physical layer of the mobile node 10 terminates on the radio network node 16, and the foreign agent's functionality resides on the packet data serving node 18. Typically, the radio network node 16 relays link layer protocol data between the mobile node 10 and the packet data serving node 18, and the packet data serving node 18 establishes, maintains and terminates the link layer to the mobile node 10. For example, the mobile node 10 may be linked to the radio network node 16 via a communication link on a radio access network.

The packet data serving node 18 provides routing services for the mobile node 10 while it is registered with the home agent 24. The packet data serving node 18 de-tunnels and delivers datagrams that were tunneled from the home agent node 24 via an IP network 20 to the mobile node 10. The communication traffic exchanged between the packet data serving node 18 and the home agent 24 includes data traffic as well as control traffic. The control traffic includes registration request or registration reply messages. The control and data traffic is routed via the packet data serving node 18 and terminates at the mobile node 10. The target host 34 may be connected to a home network 26 by any number of networks, such as the IP networks 20 and 30, or it may be directly located on the home network 26. Alternatively, the target host 34 may be connected to the home network by other types of packet switched networks.

The home agent 24 may be implemented on a router on the mobile node's home network 26. The home agent 24 maintains current location information data for the mobile terminal 10 such as foreign agent address, a Network Access Identifier ("NAI") of the mobile node 10, a mobile home address and a secret key shared between the home agent and the mobile node 10. The home agent tunnels data from the target host 34 to the packet data serving node 18, and similarly provides tunneling services in the reverse direction. More information on point-to-point tunnels, such as a Layer 2 Tunneling Protocol ("L2TP") tunnel may be found in the RFC 2661, currently available at www.ietf.org.

The home agent 24, therefore, typically implements at least two distinct tasks for the mobile node 10. First, the home agent 24 performs a registration and authentication process to determine whether the mobile node 10 is authorized to access the home network 26. This may involve, for example, checking the identification of the mobile entity, such as through the use of the mobile entity's unique serial number, NAI, or manufacturing number, password authentication, and possibly checking whether the mobile entity's account is current and paid. The home agent's registration and authentication function may be performed in conjunction with, or with the assistance of, a second device, such as an authentication, authorization and accounting ("AAA") server such as a Remote Authentication Dial-In User Service ("RADIUS") server. More information on a RADIUS server may be found on in the RFC-2138, which is currently available at www.ietf.org for more information. As is known to those skilled in the art, the registration process includes receiving and processing registration request messages from the packet data serving node 18 and sending registration reply messages to the packet data serving node 18.

The packet data serving node 18 also performs four distinct tasks for the mobile node 10. The packet data serving node 18 handles registration and session control for the mobile node 10, including sending registration request messages to the home agent 24 and processing registration reply messages received from the home agent 24. Additionally, the packet data serving node 18 has tunneling responsibilities for forwarding data packets to the home agent 24 for ultimate transmission to the target host 34, as well as de-tunneling data from the home agent 24 for ultimate delivery to the mobile node 10. Further, the packet data serving node 18 provides authentication, authorization and accounting services for the mobile node 10. The packet data serving node may perform the authentication, authorization and accounting functions in conjunction with, or with the assistance of, an authentication, authorization and accounting server, such as a RADIUS server. Additionally, the packet data service node 18 may provide Pi/FA interfaces that provide signaling/data interfaces to/from an AAA server, mobile switching center ("MSC") or a home agent.

When the mobile node 10 initiates a communication session with the radio network node 16 by sending a call setup indication to the radio network node 16 across a radio communication link, the radio network node 16 initiates a registration process with the packet data serving node 18. Typically, the radio network node 16 is configured with a number of packet data serving nodes that may provide services to the mobile node 10. In the known prior art, the radio network node 16 has no status information for any of the packet data serving nodes that are configured to serve the new communication sessions. Thus, when the radio network node 16 initiates the registration process for the mobile node 10, the radio network node 16 randomly selects a packet data serving node for the mobile node 10. In such a system, some of the packet data serving nodes available to the radio network node may be quickly overloaded while the other ones are rarely used. Further, if a number of consecutive packet data serving nodes to which the radio network node 16 sends registration requests are overloaded, such packet data serving nodes will most likely reject registration requests from the radio network node 16, thus, resulting in service delays for the mobile node 10.

The load balancing of user sessions from mobile nodes is an important capability. There are several currently existing methods that may be used for load balancing of user sessions. Typically, a radio network node is programmed with a number of IP addresses of packet data serving nodes, and the radio network node may select one of them to serve an incoming session from a mobile node. According to one existing method, a radio network node may include a packet control function that may calculate a hash value based on, for instance, an International Phone Subscriber Interface (such as a phone number) of a mobile node, and the calculated hash may be used to select a packet data serving node's IP address. The disadvantage to this scheme is that the algorithm does not take into account the current load of each packet data serving node.

According to another alternative method, the packet control function may employ a round robin mechanism to select a packet data serving node. In such an embodiment, the packet control function may assign each subsequent arriving session to the next packet data serving node in its list, wrapping around to the first packet data serving node when the last packet data serving node is reached. The round robin mechanism distributes calls between packet data serving nodes; however, it does not take into account the type of call sessions being forwarded to each packet data serving node, for instance.

Further, according to another method, an external foreign agent control node may select a packet data serving node based on memory usage, or processing power usage of the packet data serving node, for instance. The functionality of the foreign agent control node is described in U.S. patent application Ser. No. 09/881,649 entitled "System and Method for Managing Foreign Agent Selections in a Mobile Internet Protocol Network," the entire content of which is incorporated herein by reference. While the foreign agent control node provides load balancing mechanisms during selection of packet data serving nodes, there are several limitations to its current architecture. First, multiple redundant foreign agent control nodes are not easily supported given a current packet control function selection algorithm. Second, the foreign agent control node requires an additional component to be added to the system architecture, and does not allow user sessions to be saved when a PDSN crashes or otherwise becomes unavailable.

Thus, there is a need for improved system and method for selecting serving nodes, such as packet data serving nodes or home agents, in a mobile IP network.

SUMMARY OF THE INVENTION

A system and methods for load balancing and redundancy with failover capabilities of packet data serving nodes are developed.

One exemplary method involves providing an access node comprising a plurality of packet data serving nodes and at least one system manager, receiving from a radio node at a first packet data serving node on the access node a registration request to establish a communication session between the first packet data serving node and a mobile node, determining that the first packet data serving node is unable to serve the registration request, and, responsively, sending a packet data serving node selection request from the first packet data serving node to the system manager on the access node. The method further includes determining at the system manager a second packet data serving node, generating at the system manager a packet data serving node selection reply message including an address of the second packet data serving node, and sending the packet data serving node selection reply message to the first packet data serving node. The method further includes receiving the packet data serving node selection reply message at the first packet data serving node, sending from the first packet data serving node to the radio node a registration reply message including a registration rejection and the address of the second packet data serving node. The method further includes establishing a communication session between the mobile node and the second packet data serving node.

One method for providing packet data serving node redundancy includes providing an access node with a plurality of packet data serving nodes and at least one system manager, assigning a partner packet data serving node to at least one packet data serving node, establishing a monitoring mechanism between the at least one system manager and the at least one packet data serving node, and detecting a failure of one of the at least one packet data serving node being assigned an active role. The method further includes determining at the system manager a partner packet data serving node for the packet data serving node that failed, and switching communication sessions from the packet data serving node that failed to the partner packet data serving node.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which.

THE DETAILED DESCRIPTION OF THE PREFERRED EMBODIMENT(S)

Figure 1:
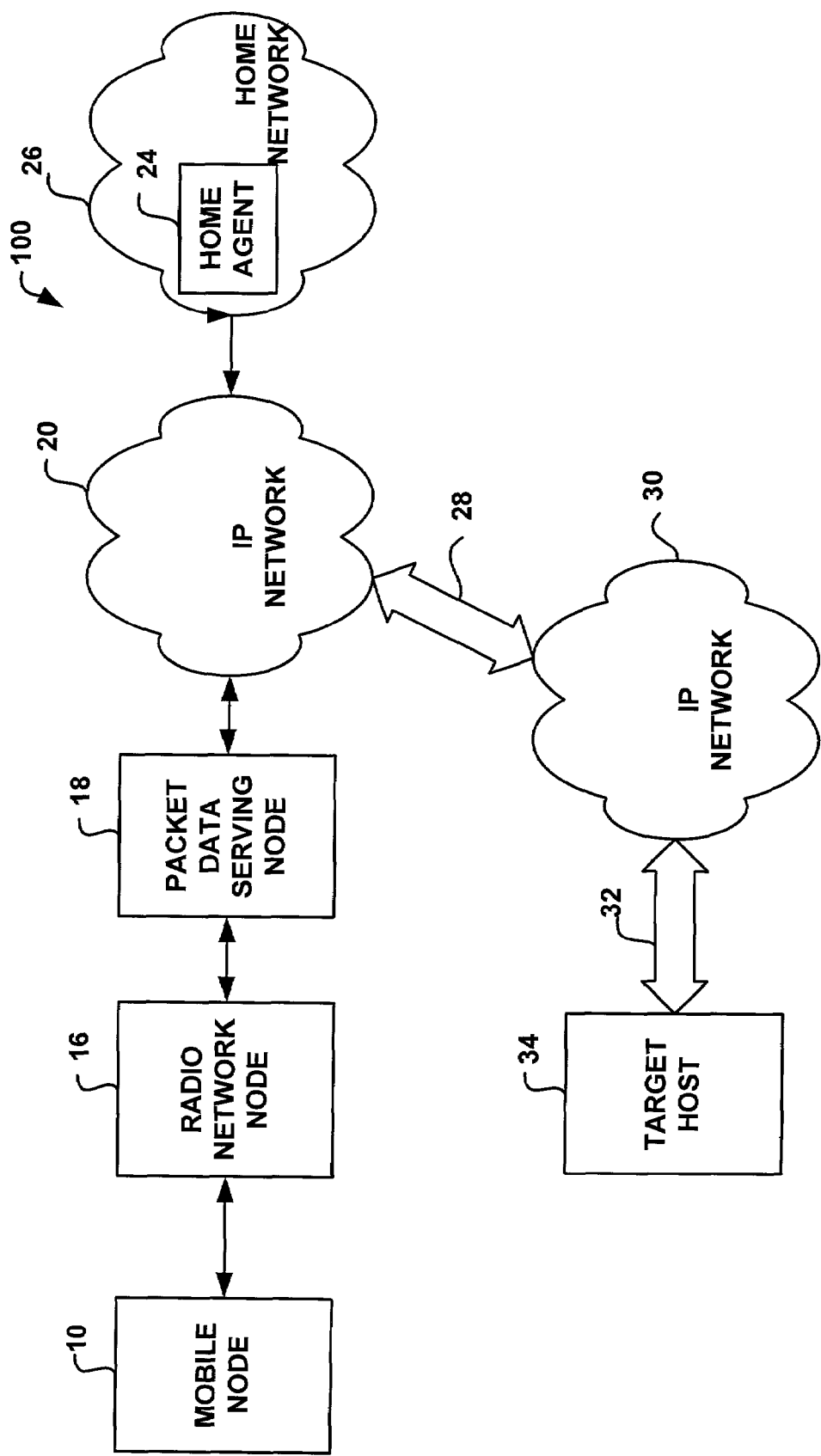
FIG. 1 is a functional block diagram illustrating an example of a prior art mobile IP network architecture.
Figure 2:
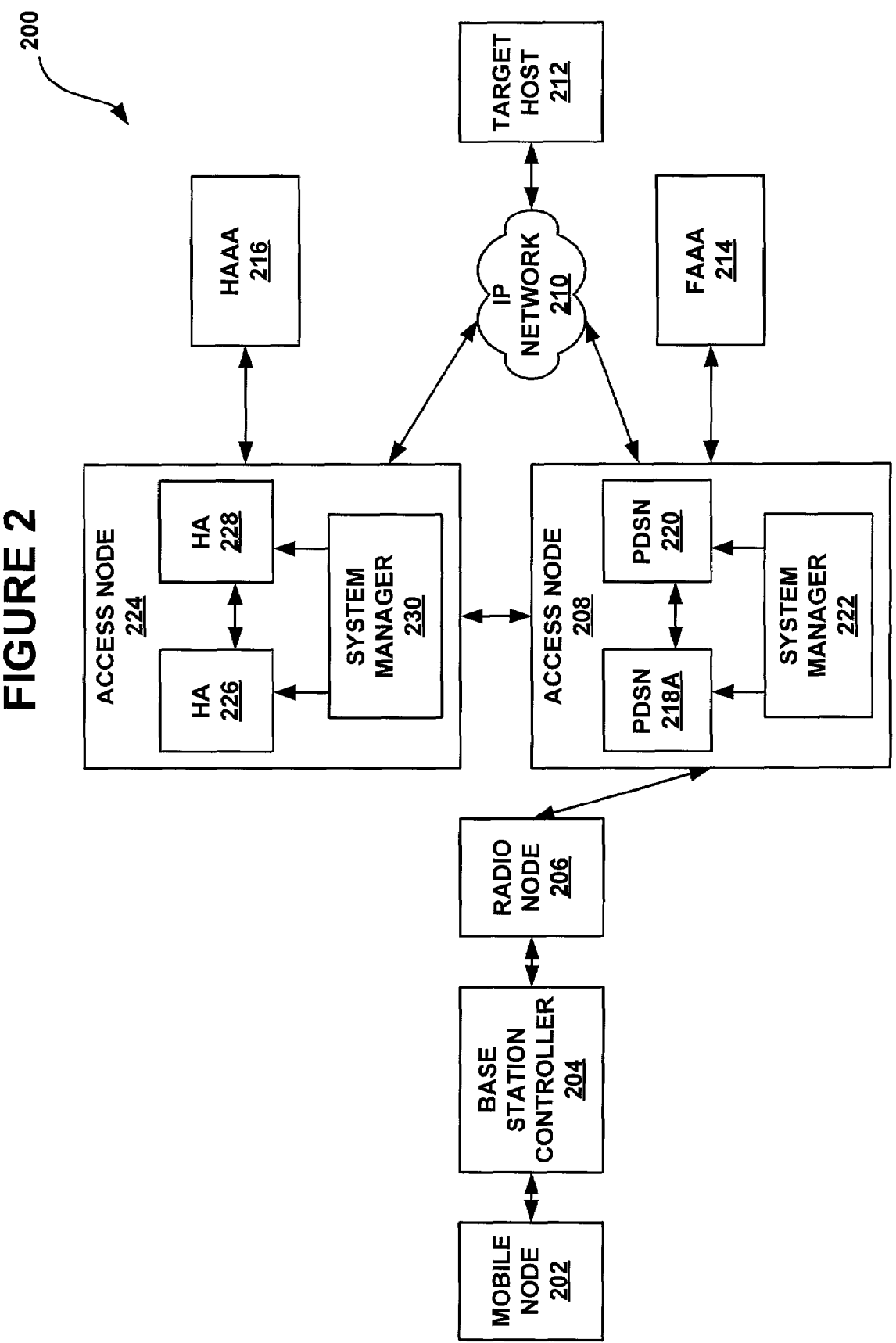
FIG. 2 is a functional block diagram illustrating an embodiment of a network system suitable for application in the present invention.

FIG. 2 is a functional block diagram illustrating an embodiment of a network system 200 suitable for application in the present invention for selecting foreign agents and home agents for mobile nodes in a mobile IP network. It should be understood that this and other arrangements and processes described herein are set forth for purposes of example only, and other arrangements and elements (e.g., interfaces, functions, order of elements, etc.) can be used instead and some elements may be omitted altogether. Further, as in most telecommunications applications, those skilled in the art will appreciate that many elements described herein are functional entities that may be implemented as discrete components or in conjunction with other components, in any suitable combination or location.

As shown in FIG. 2, the system 200 includes a mobile node 202, a base station controller 204, a radio node 206, access nodes 208 and 224, an IP network 210, a foreign authentication, authorization, and accounting ("FAAA") server 214, a home authentication, authorization, and accounting ("HAAA") server 216, and a target host 212. The mobile node 202 may take any suitable form, such as, for instance, a telephone, a lap top computer, a fax, or a personal digital assistant ("PDA"), for instance. Although only a single mobile node is illustrated, it should be understood that multiple mobile nodes may be present as well.

The mobile node 202 is connected to the base station controller 204 via a base station (not shown). The base station controller 204 may reside on a radio network such as a CDMA radio network. The base station controller 204 is coupled to the radio node 206. The radio node 206 may include a packet control function ("PCF") that selects a PDSN for a new incoming user communication session. For example, the PCF may be preprogrammed with one or more IP addresses of PDSNs.

The radio node 206 communicates with the access node 208. The access node 208 is a multiservice access platform that delivers data services to mobile nodes. According to an exemplary embodiment, the access node 208 includes a plurality of PDSNs, two of which, a PDSN 218 and a PDSN 220, are illustrated in FIG. 2. The PDSNs 218 and 220 communicate with a system manager 222. The system manager 222, among other functions that will be described hereinafter, receives load/status information from each PDSN, and determines PDSN assignment to mobile nodes. Alternatively, as will be described in greater detail below, the system manager 222 may support a distributed load database.

The access node 208 further communicates with the access node 224 including a plurality of HAs, two of which, a HA 226 and a HA 228, are illustrated in FIG. 2. The HAs 226 and 228 communicate with a system manager 230. FIG. 2 illustrates two access nodes, where the access node 208 houses PDSN cards, and the access node 224 houses HA cards. However, it should be understood that the network architecture may include a single access node housing a combination of PDSNs and HAs.

The PDSN 218 is a terminating point for Point-to-Point Protocol ("PPP") sessions from the mobile node 202. The PDSN 218 may also assemble and decapsulate the PPP packets that are then sent to a HA, such as the HA 226 or 228 on the access node 224. The access nodes 208 and 224 are further coupled to the FAAA 214 and the HAAA 216, respectively. The FAAA 214 may authenticate the mobile user logging onto a PDSN, provide specific configuration options for the user to the PDSN, or provide routing information during a mobile IP registration. The access node 208 is further coupled to the IP network 210 that is then coupled to the target host 212.

The FAAA 214 may act as a proxy for the HAAA 216 in the network service provider's domain since the PDSN cannot directly communicate with the HAAA 216, which is typically located in the home network of the mobile node. In such an embodiment, when the FAAA 214 receives an authentication request from the PDSN 218, the FAAA 214 may send the request to the HAAA 216, and the HAAA 216 may send an authentication response to the FAAA 214 that may then send it back to the PDSN 218. A shared secret may exist between the FAAA 214 and the HAAA 216 for authenticating messages being sent between them.

The HAAA 216 and the access node 224 may reside in the home network of the mobile node 202. The HAAA 216 may authenticate the mobile node registration requests at the home network. The HAAA 216 may also provide to a serving HA configuration parameters for setting up the call session. For example, the configuration parameters may include a security level, a differential service type, or reverse tunneling parameters. The HAAA 216 may also authenticate requests from the FAAA 214 on behalf of the mobile node 202. The FAAA 214 may send requests to the HAAA 216, and the HAAA 216 may authenticate the requests and send responses back to the FAAA 214, which subsequently may forward them to the PDSN 218.

Figure 3:
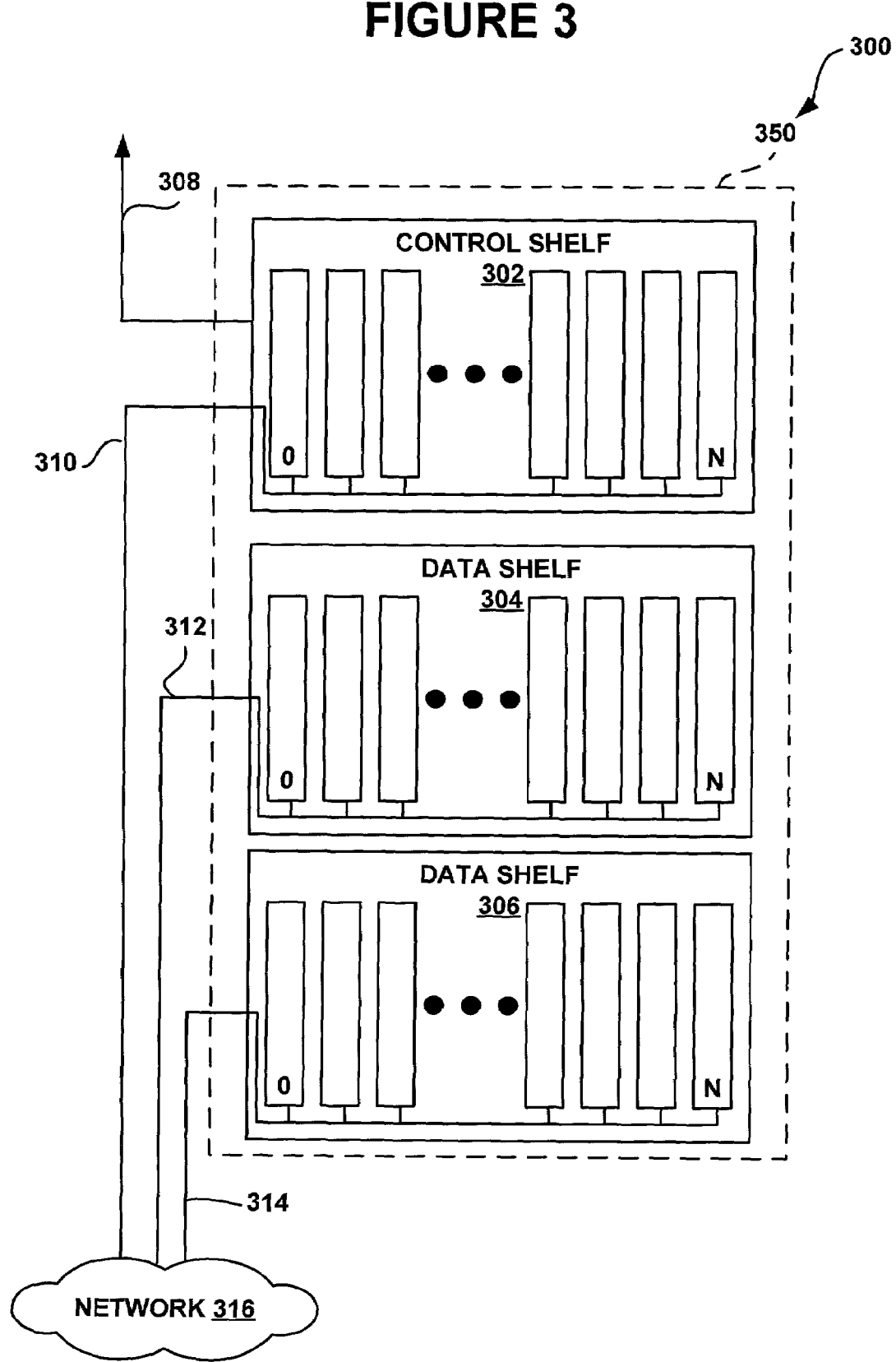
FIG. 3 is a block diagram of a access node in accordance with one embodiment of the present invention.

FIG. 3 is a block diagram 300 illustrating an exemplary embodiment of the access node 208. The access nodes 208 and 224 illustrated in FIG. 3 may be configured on a single rack 350 composed of three shelves, a control shelf 302 and two data shelves 304 and 306. The control shelf 302 is composed of a plurality of cards (0-N) that will be described in greater detail in reference to subsequent Figures. The control shelf 302 may be coupled to a network management system via a network management interface 308, thus, enabling system managers to configure the access nodes 208 and 224 according to their systems' needs. The control shelf 302 further includes an interface 310 to a network 316. In one embodiment, the network 316 may be the CDMA network, the PSTN/TDM, or the ATM network, and a data network, such as the Internet, for instance. However, different networks could also be used. In one embodiment, each card in the control chassis may include two ports, such as two Gigabit Ethernet ports that may be used for communicating data to and from the network 316.

Further, the access nodes 208 and/or 224 illustrated in FIG. 3 include two data shelves 304 and 306 having a plurality of cards (0-N) that will be also described in greater detail in reference to subsequent Figures. The data shelves 304 and 306 include interfaces 312 and 314 to the network 316. It should be understood that FIG. 3 shows only some of the external interfaces and does not illustrate connections between the chassis. Further, it should be understood that the present invention is not limited to a single rack including three chassis, and more chassis could also be added to the single rack.

Figure 4:
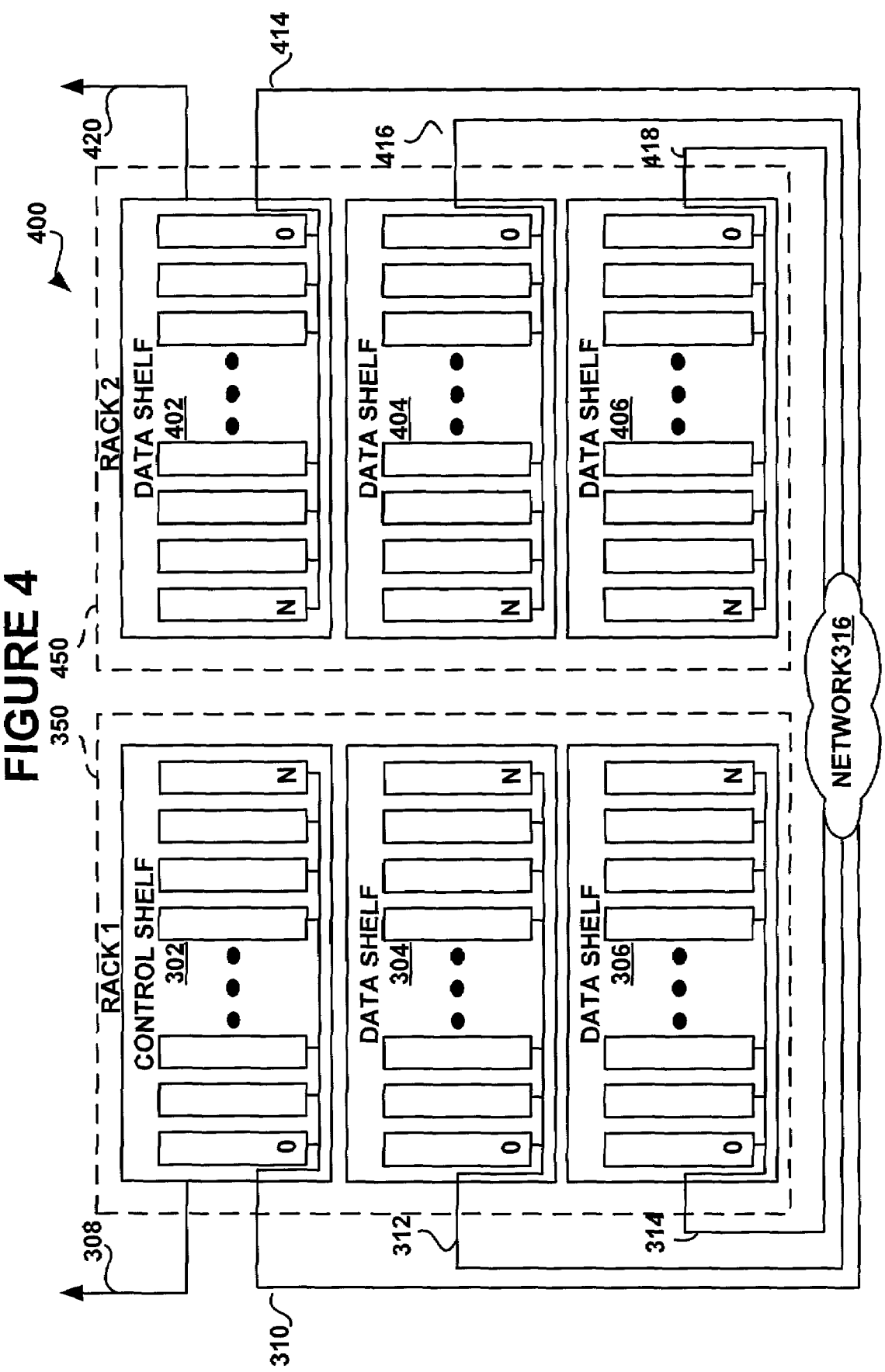
FIG. 4 is a block diagram illustrated a distributed architecture of the access node according to one embodiment of the present invention.

Alternatively, the access node 208 or the access node 224 may be distributed over a plurality of racks. In such a configuration, one control shelf may control a number of data shelves distributed over a plurality of racks. FIG. 4 is a block diagram illustrating a distributed network architecture 400 of the access node 208. In addition to the rack 350 illustrated in FIG. 3, the access node 208 further includes a second rack 450. The second rack 450 contains three data shelves 402, 404, and 406 communicating with the network 316 via interfaces 408, 410, and 412, and, further, communicating with the network 316 via interfaces 414, 416, and 418, respectively. It should be understood that the present invention is not limited to two racks, and more than two racks could also be used.

Figure 5:
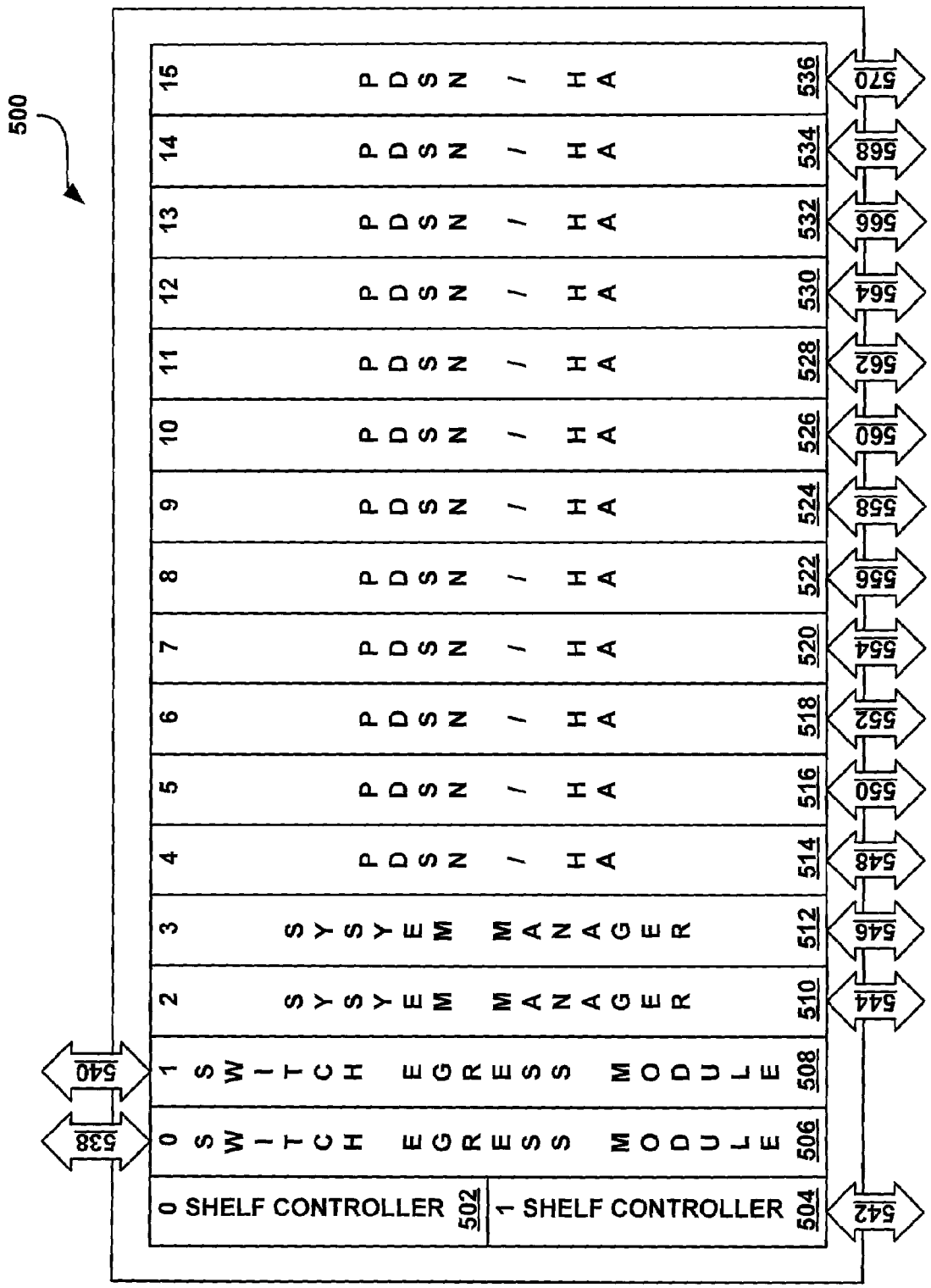
FIG. 5 is a block diagram illustrating a control shelf in the access node according to one embodiment of the present invention.

FIG. 5 is a block diagram illustrating a control shelf 500 according to one exemplary embodiment. The control shelf 500 illustrated in FIG. 5 includes 18 card slots; however, it should be understood that the control shelf is not limited to such a configuration, and it is possible that some slots could remain unused and not get populated with any cards, or fewer card slots could also be used. According to an exemplary embodiment, all components of the control shelf 500 exhibit a redundancy, such as 1 to 1 redundancy, and have failover capabilities. Thus, each component of the control shelf 500 may include an active card and a standby card so that, if the active card fails, the standby card may detect the failure and take over the role of the active card, the embodiments of which will be described in greater detail below.

The control shelf 500 includes two shelf controllers 502 and 504, and each shelf controller is supported on dedicated hardware in the form of two half-height cards located in the leftmost slots of the shelf 500. Further, the control shelf 500 includes two switch egress modules 506 and 508, two system managers 510 and 512, and a plurality of application cards 514-536 illustrated as PDSN/HA cards. It should be understood that the exemplary embodiment is not limited to the control shelf including only PDSN or HA cards, and, alternatively, the control shelf 500 may include a combination of PDSN and HA cards.

According to an exemplary embodiment, the shelf controller 502 may be configured as a primary shelf controller, and the shelf controller 504 may be configured as a backup shelf controller. Each shelf controller contains a multi-layer (L2/L3) capable switch that is used to connect the shelf controller to each card slot in the shelf. Further, each shelf controller may have a separate bus to each slot, i.e., a system control bus, hereinafter also referred to as a management bus, that is used to provide intra and inter card control communication, such as management, signaling, and routing, within a single platform. According to one embodiment, for instance, a PDSN card may communicate with one or more system manager cards or another PDSN card using the system control bus. In such an embodiment, data sent from the PDSN is communicated via the system control bus, one or more shelf controller cards to the destination such as one or more system manager cards or the PDSN card. Similarly, the system manager cards may communicate data, such as load information data, to one or more PDSN cards via the system controller bus. In such an embodiment, the data is communicated from the system manager card via the system controller bus and the shelf controller cards to the destination. It should be understood that the HAs can also use the system control bus to communicate with the system manager cards or other cards in the shelf.

The shelf controllers 502 and 504 manage the intra-shelf hardware configurations and hardware management. For example, the shelf controllers may read a shelf identifier and a shelf serial number that may then be used to facilitate assignment of internal addresses and allow the system managers to correctly associate specific card locations and configurations. Further, the shelf controllers 502 and 504 provide physical monitoring in the form of presence detection for the other card in the shelf and power sources.

The shelf controllers 502 and 504 may also poll the status of power sources, cooling fans, or temperature sensors provided in the power sources, for instance. Additionally, the shelf controllers 502 and 504 may be responsible for power management within the shelf 500 by evaluating the current requirements of the individual cards against the current available power available in the power sources. The shelf controllers 502 and 504 may communicate with all cards in the shelf 500 via an Ethernet interface 542, such as a 100 Mbps or a faster interface.

The switch egress modules 506 and 508 may be configured as high-speed point-to-point switches (L2/L3) that allow all cards in the slots, such as the system managers and PDSNs/HAs, to communicate with one another on a gigabit link. The switch egress modules 506 and 508 employ switch network interfaces 538 and 540 to communicate data to and from the network.

Further, the control chassis 500 includes the system managers 510 and 512 that may employ any existing or later developed management protocols, such as a Simple Network Management Protocol, to manage multiple chassis from a single point. The system managers 510 and 512 may maintain statistics and status information of all cards in the system by periodically polling each card using SNMP, for instance. Further, according to an exemplary embodiment, the system managers 510 and 512 may maintain load information for each PDSN or HA card, and may load balance the PDSN/HA selection based on the type of incoming sessions, the memory that is available on each PDSN, or a service profile associated with a user, the embodiments of which will be later described in greater detail. The system managers 510 and 512 may communicate with each card via interfaces 544 and 546, respectively. Further, each PDSN or HA card has a network interface, i.e., network interfaces 548-570 illustrated in FIG. 5.

Figure 6:
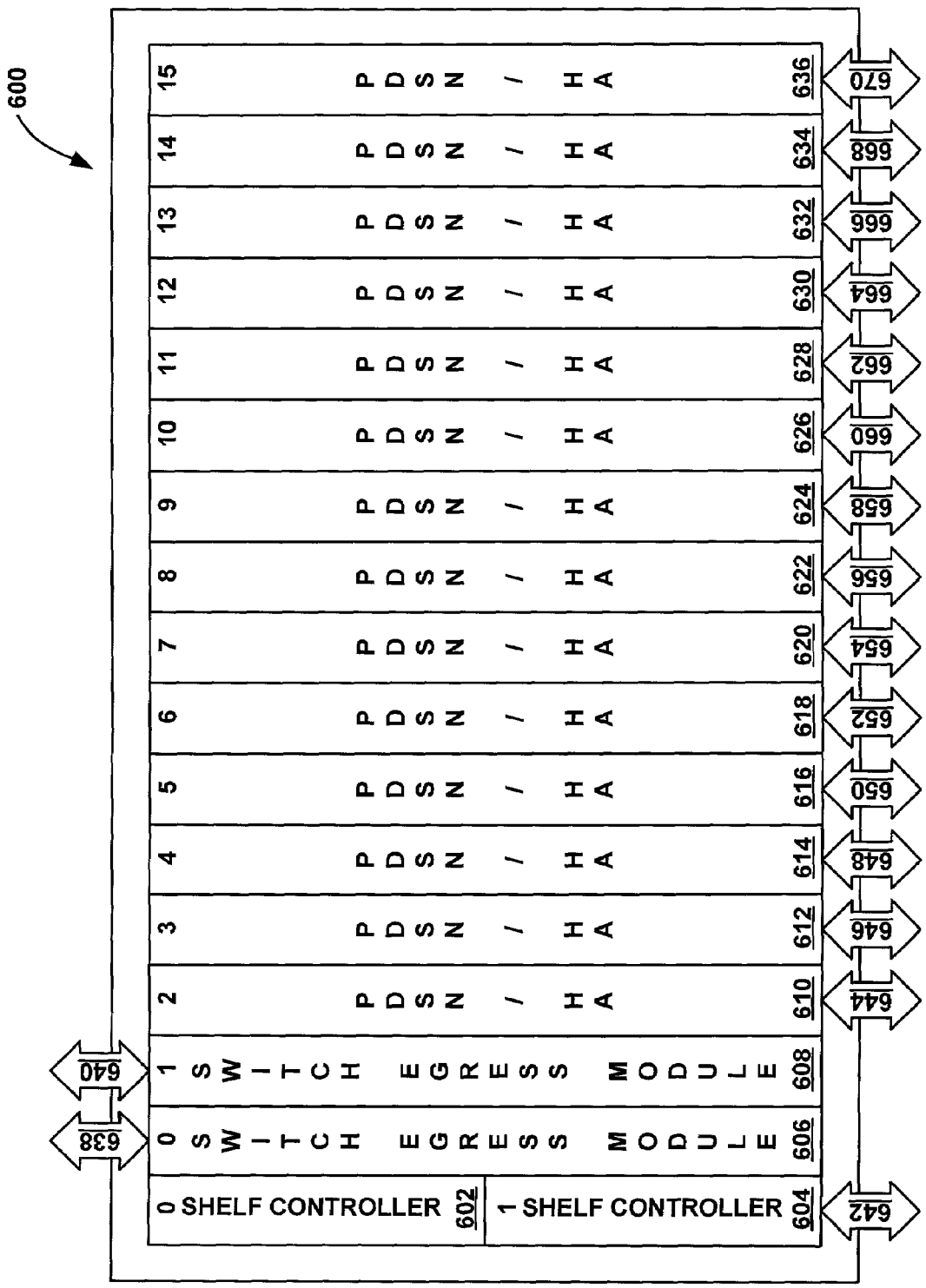
FIG. 6 is a block diagram illustrating a data shelf in the access node according to one embodiment of the present invention.

FIG. 6 is a block diagram illustrating a data shelf 600 according to one exemplary embodiment. The data shelf 500 includes shelf controllers 602 and 604 communicating via an interface 642 with all cards in the shelf 600. The data shelf 600 further includes two switch egress modules 606 and 608 communicating via switch network interfaces 638 and 640, and PDSNs or HAs 610-636 communicating via interfaces 644-670. Similarly to FIG. 5, it should be understood that the data shelf 600 is not limited to including only PDSNs or HAs, and the data shelf 600 could also include a combination of PDSN and HA cards.

Figure 7:
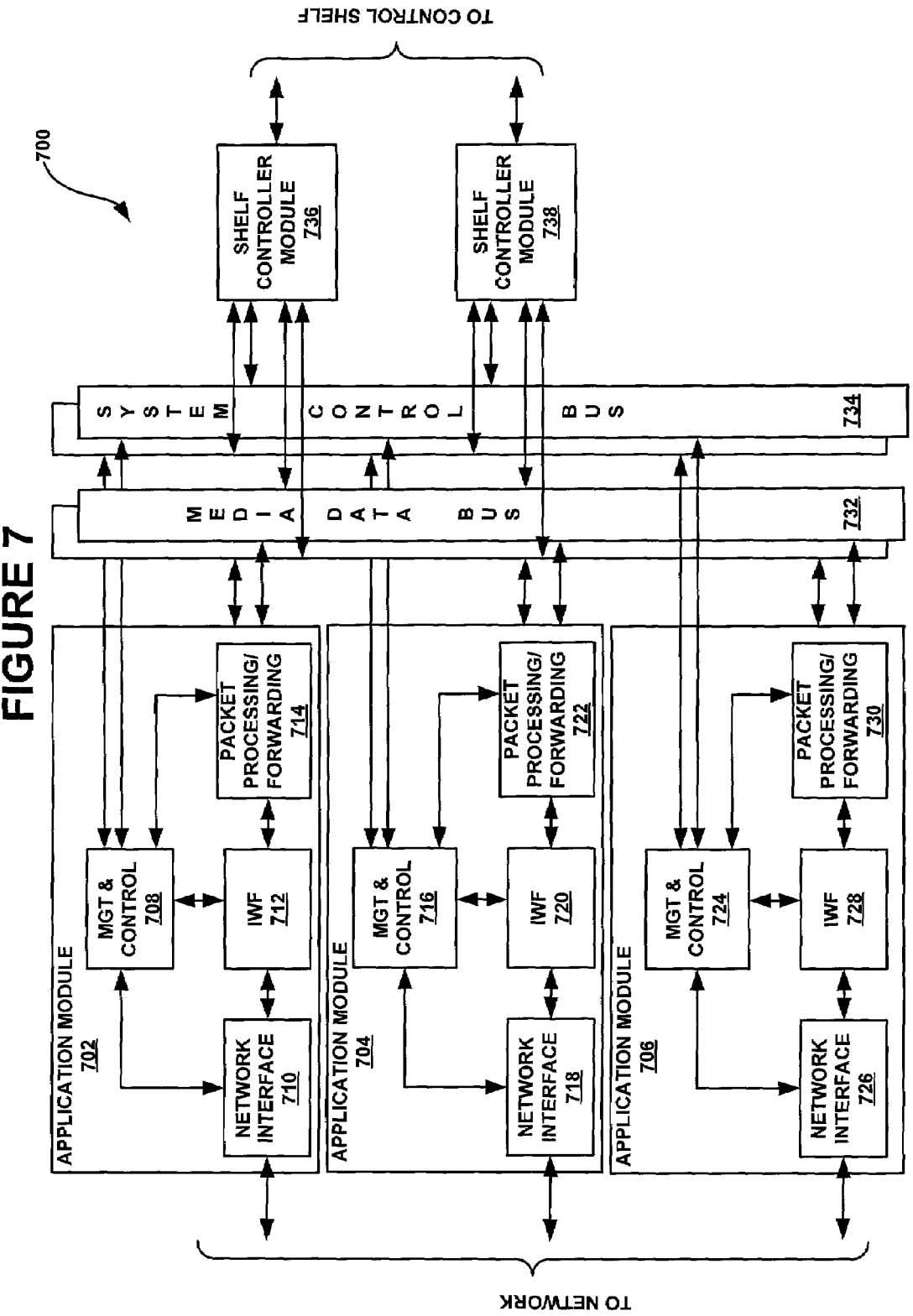
FIG. 7 is a block diagram illustrating a shelf architecture for data-plane connectivity between peer modules within a shelf and for back-plane connectivity with shelf controllers and system managers in the access node according to one embodiment of the present invention.

FIG. 7 is a block diagram illustrating shelf architecture 700 for data-plane connectivity between peer modules within a shelf and for back-plane connectivity with shelf controllers and system managers.

The shelf architecture 700 illustrates three exemplary application modules 702, 704 and 706. The application modules 702-706 include network interfaces 710, 718, and 726, inter-working functions ("IWFs") 712, 720, and 728, management and control interfaces 708, 716, and 724, and packet processing/forwarding modules 714, 722, and 730, respectively. It should be understood that the application modules 702-706 may be a PDSN module or a HA module.

The network interfaces 710, 718, and 726 provide an interface to networks such as the PSTN, a radio network, or a data network, for instance. The management and control interfaces 708, 716, and 724 provide interfaces to management and signaling networks such as an SNMP network, a Session Initiation Protocol ("SIP") network, a H.323 network, or any existing or later developed signaling networks. The management and control interfaces communicate via a system control bus 734 (or a management bus) with shelf controller modules 736 and 738 that transmit management and control messages to a control shelf, such as the control shelf 500 illustrated in FIG. 5.

The system control bus 734 provides intra/inter card control such as management, signaling, and routing communication within a single platform. In one embodiment, the system control bus 734 may be implemented as a switched Fast Ethernet (100 Mbps) system control bus that provides a physically separate and dedicated embedded network to support management and control functions of the platform. The system control bus 734 originates from each of two shelf controller modules in the shelf 700 to each slot, including the peer shelf controller slot. For instance, each shelf controller may be connected to every switch egress and application module in the shelf via one bi-directional 100Base T-TX Ethernet link. Additionally, two shelf controller modules may be connected via one bi-directional 100Base T-TX Ethernet link. In one embodiment, each connection may be configured as a pair of differential traces carrying 100 Mbps 100BaseT-TX Ethernet. Thus, in such an embodiment, each system control bus link may be a 4-wire interface including one pair of TX and one pair of RX Fast Ethernet links. However, it should be understood that different types of links could also be used.

Figure 8:
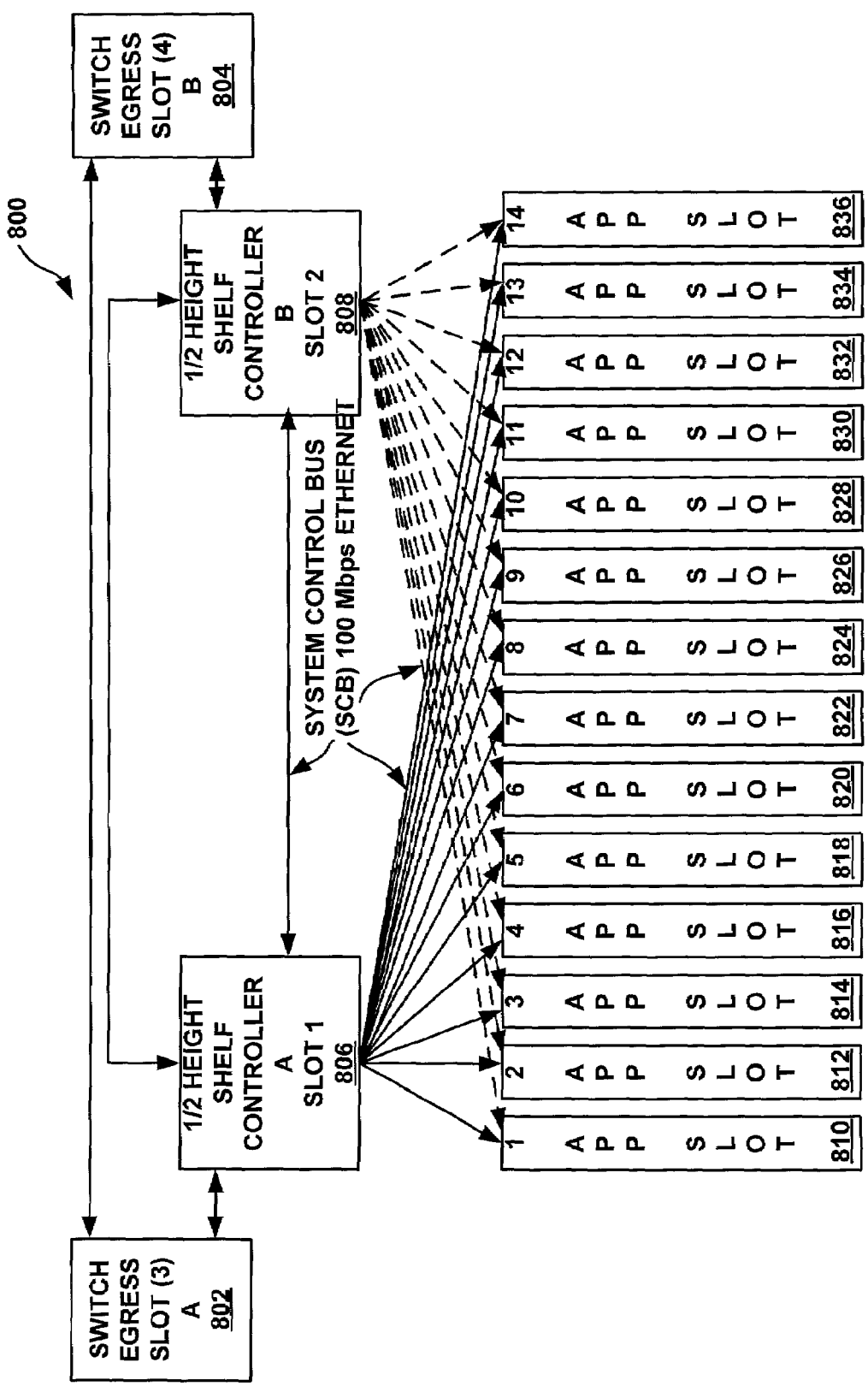
FIG. 8 is a block diagram illustrating exemplary physical interconnections of the system control bus according to one embodiment of the present invention.

FIG. 8 illustrates exemplary physical interconnections of the system control bus 734 according to one exemplary embodiment. As illustrated in FIG. 8, the system control bus 734 interconnects two shelf controllers 806 and 808 to each other, to each switch egress module 802 and 804, as well as each application card 810-836 such as each application slot housing a PDSN or HA card.

Referring back to FIG. 7, each application card and shelf controller is connected to a media data bus 732 (hereinafter also referred to as a switch fabric). The media data bus 732 distributes IP packet traffic within a single shelf. The media data bus 732 may be implemented in a star topology originating from each of the switch egress slots to all other slots on the main backplane, including the peer switch egress slot and two shelf controller slots. In one embodiment, the switched star bus may allow each differential pair to reliably transmit in the Gbps range, such as a 1.25 Gbps range, a 2.5 Gbps range, or a higher/slower range. In one embodiment, each media data bus connection from the switch egress slots may be configured as a dual (TX/RX) point-to-point differential pair (i.e., a spoke). In such an embodiment, the spokes may be distributed so that there are two spokes to the peer switch egress slot, two spokes to each application module slot, and one spoke to each one-half shelf controller slot.

According to one exemplary embodiment, one or more PDSN cards may use the media data bus 732 to communicate with each other or the system manager cards. In such an embodiment, the data being communicated to and from PDSN cards is transmitted via the media data bus 732 through one or more switch egress modules to the intended destination(s), such as the system manager cards or PDSN cards. Additionally, each PDSN card may use the media data bus 732 to send queries and receive authorization responses to/from the FAAA server 214. To send an authorization query, a PDSN card may transmit the authorization query via the media data bus 732 and the switch egress module to the FAAA server 214. Responsively, the PDSN card may receive an authorization response from the FAAA server 214 via the switch egress module and the media data bus. It should be understood that each HA card may also use the media data bus 732 to send and receive authorization information to/from the HAAA server 216, and to communicate data to/from the system manager cards and other HA cards.

Figure 9:
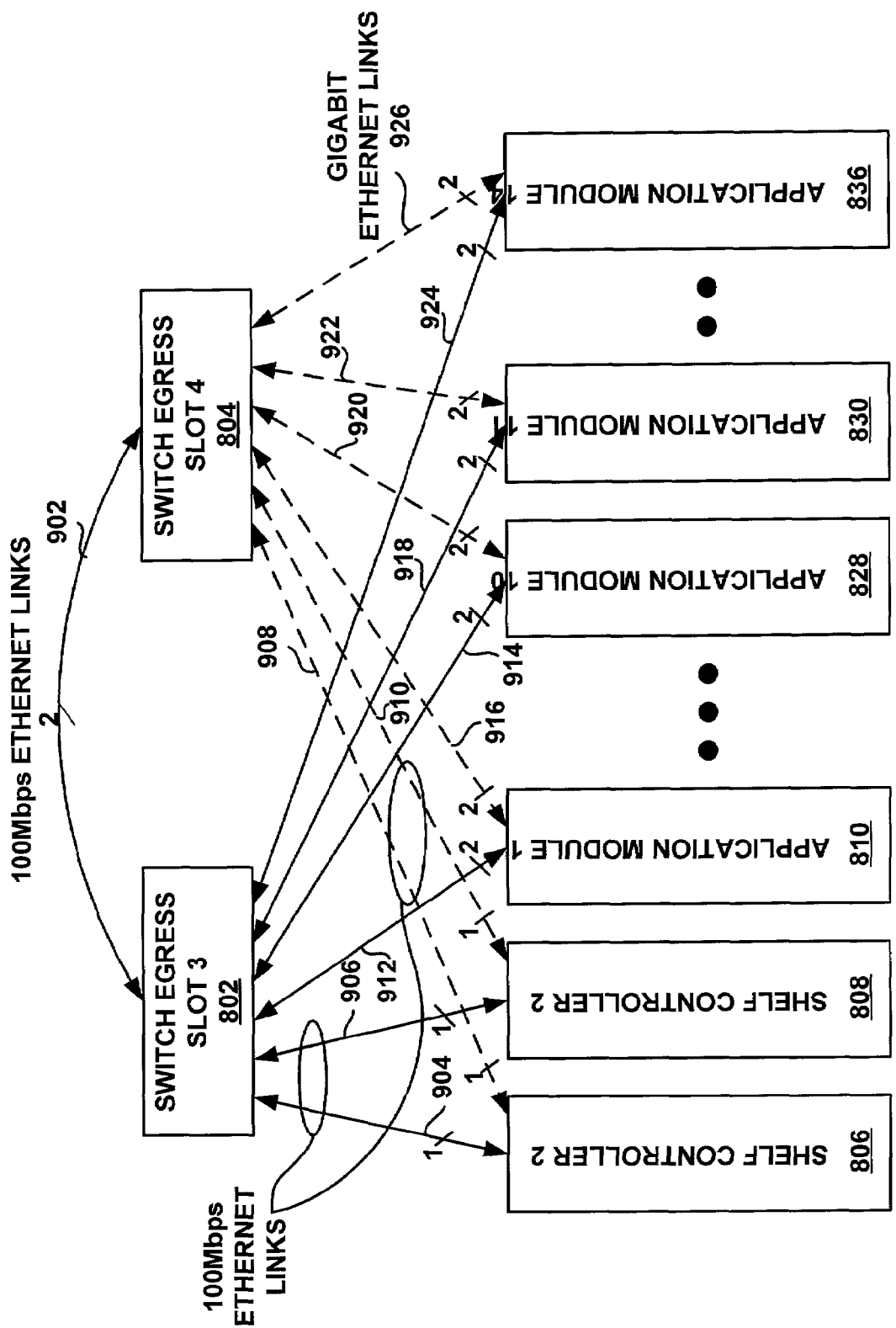
FIG. 9 is a block diagram illustrating physical interconnections of a media data bus according to one embodiment of the present invention.

FIG. 9 is a block diagram illustrating physical interconnections of the media data bus according to one exemplary embodiment. As illustrated in FIG. 9, the switch egress slots 802 and 804 are interconnected via 100 Mbps Ethernet links 902. Further, each switch egress slot is interconnected to each shelf controller 806 and 808 via 100 Mbps Ethernet links 904-910, and to each application module slot via Gbps Ethernet links 912-926. Thus, according to an exemplary embodiment, the switched gigabit Ethernet media data bus provides a physically separate and dedicated embedded network that supports inter card communication within each shelf.

Figure 10:
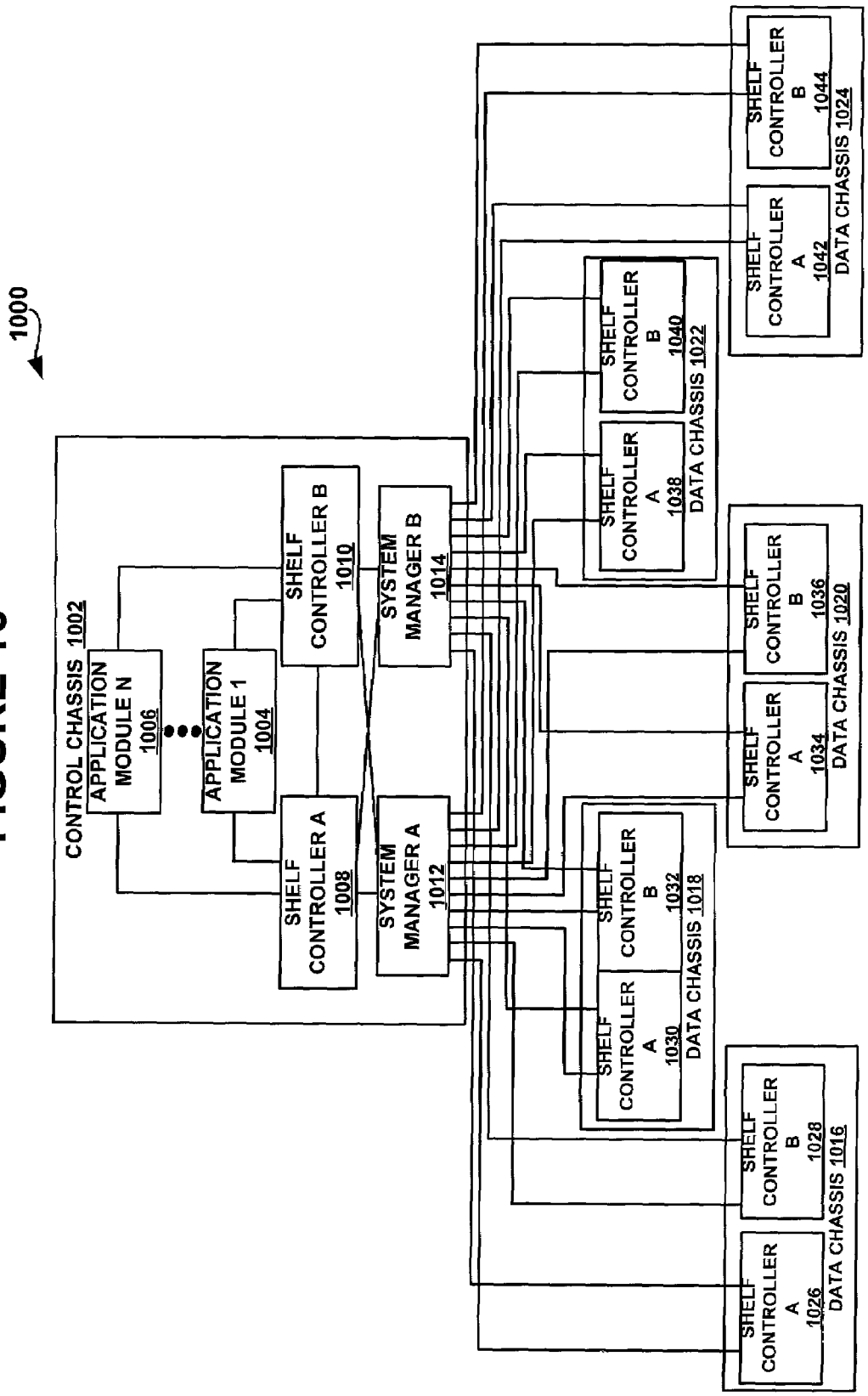
FIG. 10 is a block diagram illustrating an inter-shelf cabling topology according to one embodiment of the present invention.

According to one exemplary embodiment, an access node configuration may consist of six shelves including one control shelf and five data shelves, each of which communicates with the control shelf in order to receive control information, such as signaling and management information. FIG. 10 is a block diagram illustrating an inter-shelf cabling topology 1000 according to one exemplary embodiment.

FIG. 10 illustrates a control shelf 1002 including two system managers 1012 and 1014 interconnected to shelf controllers 1008 and 1010, and five data shelf 1016, 1018, 1020, 1022, and 1024. According to an exemplary embodiment, each data shelf includes two shelf controllers, one of which may be configured as a backup controller. Specifically, as illustrated in FIG. 10, the data shelves 1016, 1018, 1020, 1022, and 1024 include shelf controllers 1026 and 1028, 1030 and 1032, 1034 and 1036, 1038 and 1040, 1042 and 1044, respectively.

Each shelf controller contains a multi-layer Ethernet switch that provides a management communications infrastructure within the shelf. Further, each shelf controller provides a single star bus interface with two external connections to allow each of the redundant system managers to connect to each shelf controller. In the control shelf 1002, the path to the shelf controllers 1008 and 1010 may be configured via the control plane interface on the backplane.

In the multi-chassis configuration, all inter-shelf connectivity is made through the system managers 1012 and 1014, physically located in the control shelf 1002, to the shelf controllers 1026-1044 within the data shelves 1016-1024. The shelf controllers establish physical connections to the application cards within their shelves. One such exemplary embodiment is illustrated in FIG. 10 in reference with the control shelf 1002, in which the shelf controllers 1008 and 1010 are interconnected to a number of application modules illustrated with application modules 1004 and 1006.

Each shelf controller illustrated in FIG. 10 contains a multi-layer (L2/L3) switch, such as a IEEE 802.1p/Q capable switch that contains twenty-four 10/100 ports and two-Gigabit Ethernet ports. In one embodiment, each shelf controller may include the Broadcom BCM 5600 series Strata Switch; however, different switches could also be used. As explained in reference to earlier Figures, each shelf controller has a physically separate management bus, i.e., a system control bus, to each slot within the shelf. Further, two shelf controllers within a shelf are connected to each other with dual 10/100 Mbps links.

The inter-shelf communication architecture illustrated in FIG. 10 is used for network management and carrier signaling purposes. It should be understood that switch egress modules (not illustrated in FIG. 10) also provide two external gigabit links that can also be used in the wireless system for connecting multiple chassis. Further, according to exemplary embodiments illustrated in FIG. 10 and preceding Figures, the control shelf functions reside in a single designated shelf to achieve management and operation consistency. However, it should be understood that the control shelf functionality may be distributed over a number of shelves.

According to an exemplary embodiment, the PCF on the radio node 206 illustrated in FIG. 2 may route a new communication session to any PDSN of the access node 208, and all PDSNs may periodically send their load information to system managers, such as the system managers 510 or 512 illustrated in FIG. 5. The system managers are arranged in a mated pair, where one system manager card serves as a backup for the other. In such an embodiment, when a primary system manager receives load information from a PDSN, it may pass the load information to its backup partner. Thus, in case of software or hardware failure of the primary system manager, the backup system manager may detect the failure and take over the functionality of the primary system manager.

The system managers maintain statistics and status information related to all cards in each chassis in the access node 208. Further, each system manager may be programmed with PDSN IP addresses that the system manager will service, and each PDSN IP address may map to a predetermined set of characteristics of the corresponding PDSN. For instance, the system managers may group sets of PDSNs based on session types, session bit rates, or a number of sessions that each PDSN in the group can handle. Further, during a normal operation of the access node 208, the system managers may build dynamic databases for each PDSN, HA, and each mobile terminal being served on the access node.

In one embodiment, a PDSN profile or a HA profile may define a PDSN or a HA for which the profile was created using a PDSN IP address or a HA IP address, respectively. Further, each profile may define session types, session bit rates, or a number of sessions that the respective PDSN or HA is configured to handle. Additionally, each PDSN and HA profile may include a status and a state of the respective PDSN and HA, and load information for that PDSN and HA. For instance, among other parameters, the status may define whether a PDSN or HA is active or inactive, and the state may define whether the PDSN or the HA is a primary PDSN/HA or a backup PDSN/HA. In addition to the state information for each PDSN or HA, the profile may also define an IP address of its partner PDSN or HA.

Further, according to an exemplary embodiment, each PDSN and HA may be configured to periodically send their load information to the primary system manager, which then provides the received load information to the backup system manager. The load information may include, among other parameters, a CPU load, a memory load, a number of active sessions, or types of sessions being handled. For instance, a PDSN profile may define whether an IPsec has been negotiated for a particular session, or a type of PPP compression being used for the session. However, it should be understood that different criteria for defining types of sessions could also be used. In such an embodiment, a system operator may download load configurations for different PDSNs in the access node 208, thus, providing better service and connectivity for users with special session types.

Further, according to an exemplary embodiment, the system managers may include mobile user information records for mobile nodes that are being served or were served by one of the PDSNs or HAs associated with the access node. For instance, each mobile user information record may associate a mobile user with its corresponding mobile telephone number (IMSI), its mobile connection identifier (MN-ID), and one or more mobile sessions indexed by NAI, for instance. Further, each mobile user information record may include a PDSN IP address of the last PDSN that served the mobile user, a mobile session status (i.e., active or idle), and a mobile profile, such as a FAAA profile of the mobile session, for instance.

Figure 11:
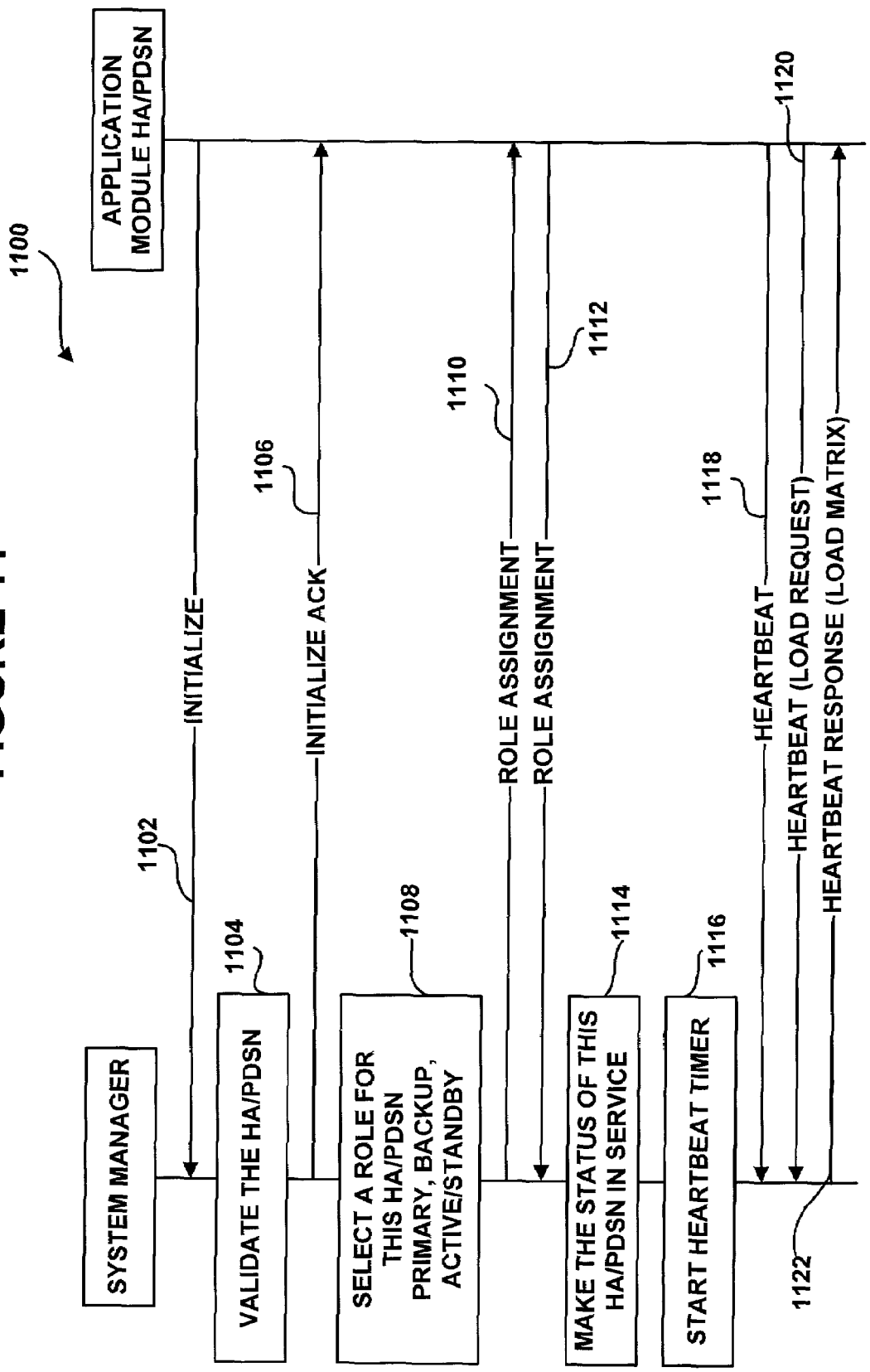
FIG. 11 is a block diagram of a message sequence scenario illustrating a PDSN/HA boot up process according to one embodiment of the present invention.

According to an exemplary embodiment, the PDSNs and HAs in the access node 208 may use a heartbeat mechanism to convey their availability and load information to the system manager. FIG. 11 illustrates an exemplary boot up process for an application module such as a HA or a PDSN. FIG. 11l simplifies the boot up process for a PDSN and a HA by illustrating a PDSN and a HA in a single PDSN/HA block; however, it should be understood that the HA and the PDSN are located on different application modules in the access node 208 according to an exemplary embodiment.

At step 1102, an application module, such as a PDSN or a HA, powers up and starts communicating with the primary system manager by sending an Initialize message to the system manager. At step 1104, the system manager validates the HA or PDSN. To do that, the system manager may read the HA or PDSN from its physical HA or PDSN list. Upon a successful validation, at step 1106, the system manager sends an Initialize Acknowledge message to the HA/PDSN.

At step 1108, the system manager selects a role for this HA/PDSN. In one embodiment, the role assignment may be dynamic. Alternatively, the system manager may be preprogrammed with role assignment files defining a role for each card such as a PDSN or a HA in the access node so that a redundancy mechanism is established. For instance, the HA/PDSN may be configured as a primary HA/PDSN having a predetermined HA/PDSN acting as its backup. Further, the HA/PDSN may assign an active role to the HA/PDSN. Alternatively, if the HA/PDSN is assigned as a backup for another HA/PDSN, the system manager may further assign a standby role to the HA/PDSN to act as a redundant HA/PDSN for a predetermined primary HA/PDSN. Different redundancy mechanisms will be described in greater detail below.

At step 1110, the system manager sends a role assignment message to the HA/PDSN, and the HA/PDSN responds by sending a role assignment acknowledge message 1112 to the system manager. At step 1114, the system manager marks the HA/PDSN as being in service, and, at step 1116, the system manager starts a heartbeat timer. In one embodiment, the heartbeat timer may identify a time period within which a next heartbeat message should be received from the PDSN/HA so that the system manager may determine that the PDSN/HA is unavailable if the next heartbeat is not received before the time period expires. Alternatively, the system manager may determine that a module is unavailable if two or more heartbeats are not received from that module. Similarly, if no heartbeat is received from the system manager, the HA/PDSN may detect the failure of the primary system manager and may send subsequent heartbeats to a redundant system manager that now acts as a primary system manager.

According to an exemplary embodiment, all PDSNs and HAs in the access node 208 periodically send their load information to the system manager so that the system manager has a rack-wide view of the load on all PDSNs and HAs. In one embodiment, a PDSN or a HA may periodically request the system manager to provide a consolidated load matrix including load information of all PDSNs or HAs in the access node 208. In such an embodiment, the PDSN/HA in one of its heartbeats may request a load matrix from the system manager, and the system manager may send the load matrix to the PDSN/HA in the heartbeat response, as illustrated in FIG. 11 at steps 1120 and 1122. Further, alternatively, the PDSN/HA modules may receive load information from other PDSNs/HAs using IP multicasting, where each participating PDSN/HA is part of a multicasting group and supports a distributed information database.

According to an exemplary embodiment, a PDSN/HA may communicate with the system managers via the management bus (i.e., the system control bus). Alternatively, the control messages could also be exchanged via the media data bus (i.e., the switch fabric).

Figure 12:
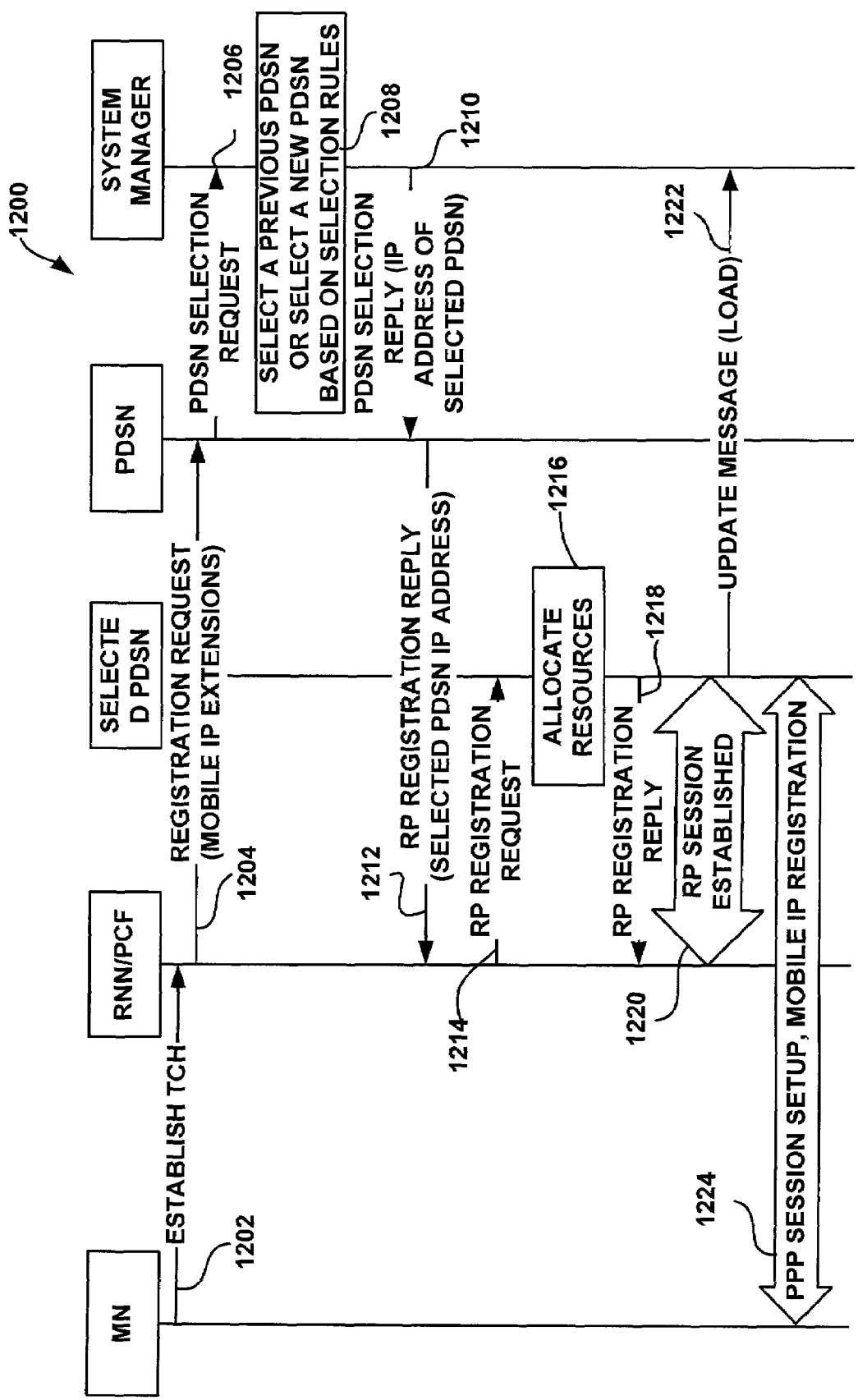
FIG. 12 is a block diagram of a message sequence scenario illustrating a PDSN selection method using a system manager according to one embodiment of the present invention.

FIG. 12 is a block diagram of a message sequence scenario 1200 illustrating a PDSN selection method using a system manager. The block diagram includes a mobile node (MN), Radio Network Node (RNN), a selected PDSN, a PDSN, and a system manager. It should be understood that the illustrated PDSNs and system manager are part of the access node 208 described in greater detail in reference to the preceding figures. When the mobile node roams into a service area of the radio network node, the mobile node initiates a traffic channel ("TCH") setup with the radio network node, as illustrated at step 1202. Upon establishing of the traffic channel, a packet control function (PCF) on the radio network node sends a registration request message 1204 to the PDSN. In one embodiment, the PCF may be configured with a set of PDSNs on the access node 208, and the PCF may select the PDSN based on its internal selection mechanism such as a load balancing mechanism or a round robin mechanism, for instance.

In the embodiment illustrated in FIG. 12, when the PDSN receives the registration request message 1204, the PDSN is unable to serve the session. The unavailability of the PDSN to serve the new session may include many reasons. The PDSN may decline to serve the session because it is overloaded. For instance, the PDSN may be configured with a threshold level identifying a number of sessions that the PDSN may serve before rejecting new sessions. Alternatively, the PDSN may be configured to monitor its capacity, and when a predetermined percentage of capacity is used, the PDSN may refuse to service a new session. Further, the PDSN may decline to service a new session due to its functional configuration. For instance, the PDSN may be configured to serve only a predetermined type of sessions, such as sessions using compression or encryption. Further, the PDSN may reject the registration request based on the required data rate or a type of activity associated with the session such as streaming data vs. real-time chat, for instance. Further, it should be understood that even if the first PDSN declines to serve the new session, the first PDSN may still have the lowest load compared to other PDSNs in the system, and the system manager may select that PDSN to serve the new session. It should be understood that different embodiments are possible as well. Further, alternatively, the PDSN may receive a load matrix from the system manager, and the system manager may identify a load level for each identified PDSN. In such an embodiment, the PDSN may reject to serve the incoming session because its load is higher that the load of one or more PDSNs identified in the load matrix.

In the embodiment illustrated in FIG. 12, the system manager determines an alternative PDSN. Thus, the PDSN sends a PDSN selection request message 1206 to the system manager, and, at step 1208, the system manager selects a new PDSN based on a set of selection rules. The selection rules may include prior records selection rules, type of service rules, or load balancing rules. In one embodiment, the system manager may be configured to use one set of rules, such as the load balancing rules only, or a combination of different selection rules. For instance, the system manager may use one selection rule to determine a subset of PDSNs that may service the incoming session and then may use another rule to select one PDSN that may service the incoming session.

As mentioned in the preceding paragraphs, the system manager may apply prior records selection rules to determine a new PDSN. In such an embodiment, the system manager uses the prior registration records of the mobile user to determine and select the PDSN that served the previous session on the mobile node. In one embodiment, each PDSN may be configured to send registration records for a mobile node upon a successful call setup. Alternatively, the session information may be included in a load update message that is sent from each PDSN to the system manager upon allocating resources for a new session.

According to an exemplary embodiment, the system manager may create and manage an information database including PDSN selection matrix information. For example, the database may be divided into a basic matrix that is used for load distribution and data that is used for value added services, such as a destination-based billing.

The basic data matrix may be used to distribute call flows across a set of PDSNs based on per PDSN CPU usage, memory usage or a total call load (without taking into account specific call details). Further, the information database may include a next level of selection rules based on a weighted data matrix. Specifically, different sessions (calls) affect PDSN loads differently. As the communication systems evolve, and more users and services are added, the PDSN selection using only the total number of active calls may be inaccurate. For example, a virtual private network ("VPN") call using IPsec is more CPU intensive than a simple IP call, or a call with destination-based billing enabled may require more resources than a call using standard billing methods. Thus, the PDSN selection mechanism could be further refined to expand the total call information into a weighted matrix including more call-related information. For example, the session count on each PDSN may be divided into low, high and average speed calls, such as, for CDMA 1xRTT—32, 64, and 128 kbps. Additionally, a separate count could be established for the IPsec enabled calls.

Further, it should be understood that a PDSN may be selected based on the required quality of service ("QoS") or type of service ("ToS"), and the QoS, ToS, and other selection parameters may be part of a separate matrix. The quality of service parameters and other parameters may be in part based on the packet classification, filtering and metering that may be needed for implementing CPU intensive QoS schemes, such as "diffserv," for instance. Typically, QoS parameters are specified in packet headers, and the depth of the header lookup determines the CPU usage. Packet classification may be used for tracking network flows that could be used for firewall protection, for example. Tracking network flows could also be used for bandwidth allocation and premium services. For example, a matrix may define, a number of calls (per PDSN), in which network flows need to be tracked. Additionally, the matrix may define a classification depth that specifies a number of bits matched and a number of lookups per packet.

Upon selecting a PDSN, the system manager sends to the PDSN a PDSN selection reply message 1210 including an IP address of the selected PDSN. When the PDSN receives the message 1210, the PDSN sends to the radio network node an RP registration reply message 1212 including the IP address of the selected PDSN. The RP registration reply message 1212 may take a form of a message "Error 136," described in the RFC 2002. However, different types of messages could also be used.

Next, the radio network node sends an RP registration request message 1214 to the selected PDSN, and the selected PDSN allocates resources to serve the incoming session, as illustrated at step 1216. It should be understood that the selected PDSN may reject to serve the incoming session, and the process of querying the system manager may be repeated. In such an embodiment, the system manager may determine that a PDSN selection request has been sent from the selected PDSN, and the system manager may reply with a PDSN selection reply included the IP address of the PDSN that sent the request. Additionally, the PDSN selection reply message may include an identifier, such as a predetermined bit or a bit pattern, notifying the PDSN that it should serve the session. Further, it should be understood that a predetermined bit or a bit pattern may be set in the PDSN selection reply message indicating a number of PDSNs that have rejected processing the request. In such an embodiment, the PDSN may be configured to accept the request when the predetermined number of PDSNs rejected to service the session. It should be understood that different embodiments preventing service delays or a large number of PDSNs rejecting new sessions could also be used.

Upon allocating resources, the selected PDSN sends an RP registration reply message 1218, and the RP session is established between the radio network node and the selected PDSN, as illustrated at 1220. Further, according to an exemplary embodiment, upon the allocation of resources to the new session, the selected PDSN sends to the system manager an update message 1222 including a new load on the selected PDSN. The update message 1222 may include session information for the established call session including the NAI or IMSI of the mobile node. Alternatively, the selected PDSN may send to the system manager a separate message including the session information. As mentioned in reference to the preceding paragraphs, the system manager may use the session information to determine the last serving PDSN when the mobile node registers next time. At step 1224, the mobile node establishes a point-to-point protocol ("PPP") session to the selected PDSN and registers with the selected PDSN.

Figure 13:
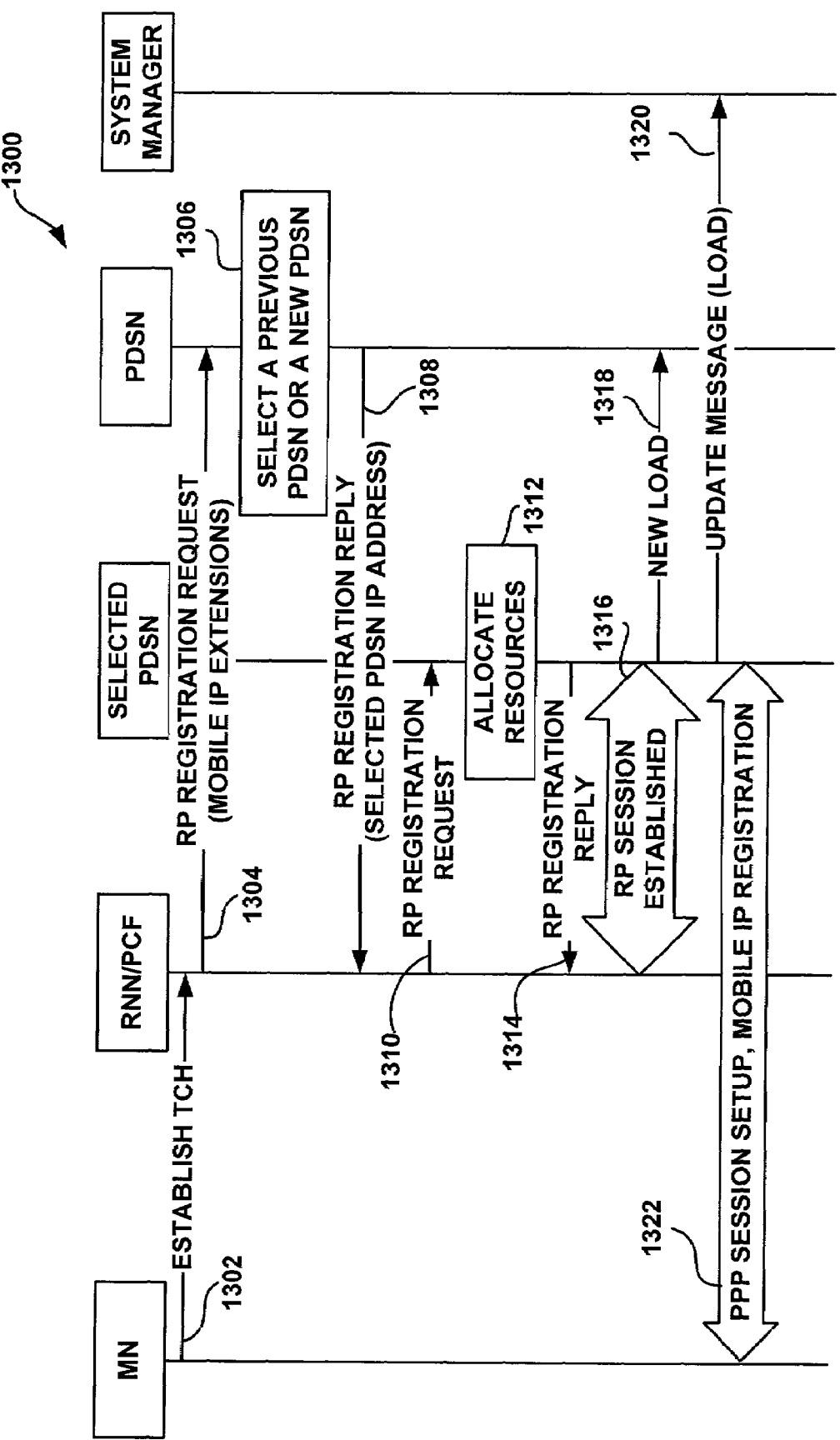
FIG. 13 is a block diagram of a message sequence scenario illustrating a PDSN selection method using a distributed information database mechanism according to one embodiment of the present invention.

FIG. 13 is a block diagram of a message sequence scenario 1300 illustrating a PDSN selection according to a distributed control node method. In the distributed control node mechanism, each PDSN card in the access node may periodically request a system manager to provide load information of all PDSNs in the access node 208. Alternatively, the PDSN may receive load information from all PDSNs in the access node 208. In such an embodiment, each PDSN may provide load information to other PDSNs using IP multicasting methods, or any other currently existing or later developed transmission methods. FIG. 13 illustrates a mobile node, a radio network node with a packet control function, a selected PDSN, a PDSN, and a system manager.

When the mobile node roams into the serving area of the radio network node, the mobile node sends to the radio network node a message 1302 including a request to establish a traffic channel with the radio network node. When the channel is established, the radio network node sends an RP registration request message 1304 to the PDSN. In an embodiment, in which the packet control function keeps a plurality of PDSN IP addresses in its PDSN table, the packet control function may apply a load balancing mechanism to determine the IP address of the PDSN. Alternatively, the packet control function may keep only two entries in its table including an IP address of a primary PDSN and an IP address of a secondary PDSN. In such an embodiment, the PCF may send all new call session requests to the primary PDSN until the primary PDSN is unavailable to serve the incoming session. When the primary PDSN fails or becomes overloaded, the PCF may send new call sessions to the IP address of the secondary PDSN.

According to an embodiment illustrated in FIG. 13, the PDSN determines that it is unable to service the incoming registration request, or at least that PDSN is above a predetermined threshold level such that another PDSN should preferably handle the call. The PDSN may make that determination based on a number of factors discussed in reference to FIG. 12. Further, the PDSN participates in the distributed load database mechanism, and, thus, includes load data of all or a number of PDSNs on the access node. In one embodiment, the PDSN may first determine whether the last serving PDSN associated with the mobile node is available to serve the new session. For instance, a PCF may specify the last serving PDSN for the mobile node in an R-P registration message. Alternatively, session information including the last serving PDSN for a mobile node may be stored on the system manager. Further, alternatively, the PDSN receiving the request may send a request to a number of PDSNs to determine if one of them previously served the call. Once the PDSN determines the last serving PDSN, the PDSN may determine if the last serving PDSN is available to serve the session.

If the last serving PDSN is unavailable, the PDSN may select a new PDSN based on a type/quality of call, a nature of activity, a call data rate, or a type of service subscribed by a user. Further, the PDSN may determine whether the selected PDSN is not overloaded. If the selected PDSN is overloaded, the PDSN may select another PDSN having the same capabilities but a lower load. For instance, the system manager may receive capability information from a PDSN when the PDSN is initialized and registers with the system manager for the first time. In such an embodiment, the system manager may include a centralized database including load and capability information for each PDSN in the system. Further, in such an embodiment, the centralized database may then be replicated on one or more PDSNs. For instance, the system manager may convey the capabilities and load information of a PDSN to other PDSNs in periodic load update messages being sent from the system manager. Alternatively, in the embodiment, in which a PDSN provides periodic load update messages directly to other PDSNs, the PDSN may define its capabilities in each load update message.

Once the PDSN selects a new PDSN, the PDSN sends to the radio node an RP registration reply message 1308 including an IP address of the selected PDSN. Further, according to an exemplary embodiment, before sending the RP registration reply message 1308 to the radio network node, the original PDSN may directly notify the selected PDSN so that the selected PDSN will expect to receive a registration request from the mobile node. For instance, the original PDSN may use the media data bus or the media data bus via the switching egress module to notify the selected PDSN. Alternatively, for inter-shelf communication, the original PDSN may notify the selected PDSN via its external interface or via the switching egress module's external interface.

When the radio network node receives the IP address of the selected PDSN, the radio network node sends an RP registration request message 1310 to the IP address of the selected PDSN, and the selected PDSN allocates resources for the new session, as shown at 1312. Next, the selected PDSN sends an RP registration reply message 1314, and an RP session 1316 is established between the radio network node and the selected PDSN. Further, according to an exemplary embodiment, the selected PDSN sends its updated load information to the original PDSN, as shown at 1318. FIG. 13 illustrates only one PDSN receiving the load information from the selected PDSN; however, it should be understood that the selected PDSN may also send its load to other PDSNs in its multicast group. Further, the selected PDSN may send to the system manager an update message 1320 including its new load. It should be understood that the system manager could be a part of the multicast group as well. Alternatively, the selected PDSN may send its new load to the system manager in a heartbeat message.

Upon successful registration with the selected PDSN, a PPP session is established between the mobile node and the selected PDSN, and the mobile registers with the selected PDSN, as shown at 1322.

According to one exemplary embodiment, in addition to PDSNs, the access node may also include HAs that are also managed by the system manager. As mentioned in reference to FIG. 11, all HA in the access node heartbeat with the system manager and periodically send their load information to the system manager. Similarly to the embodiments described in reference to PDSNs, the system manager may keep a control node database including loads for each HA in the access node. Alternatively, the control node database may be distributed across all HA, where each participating HA may keep load information of all other participating HAs. In such an embodiment, each participating HA may update its load on other HAs using IP multicasting, and all participating HAs and the system manager may be a part of a multicasting group to support the distributed control node information database.

Figure 14:
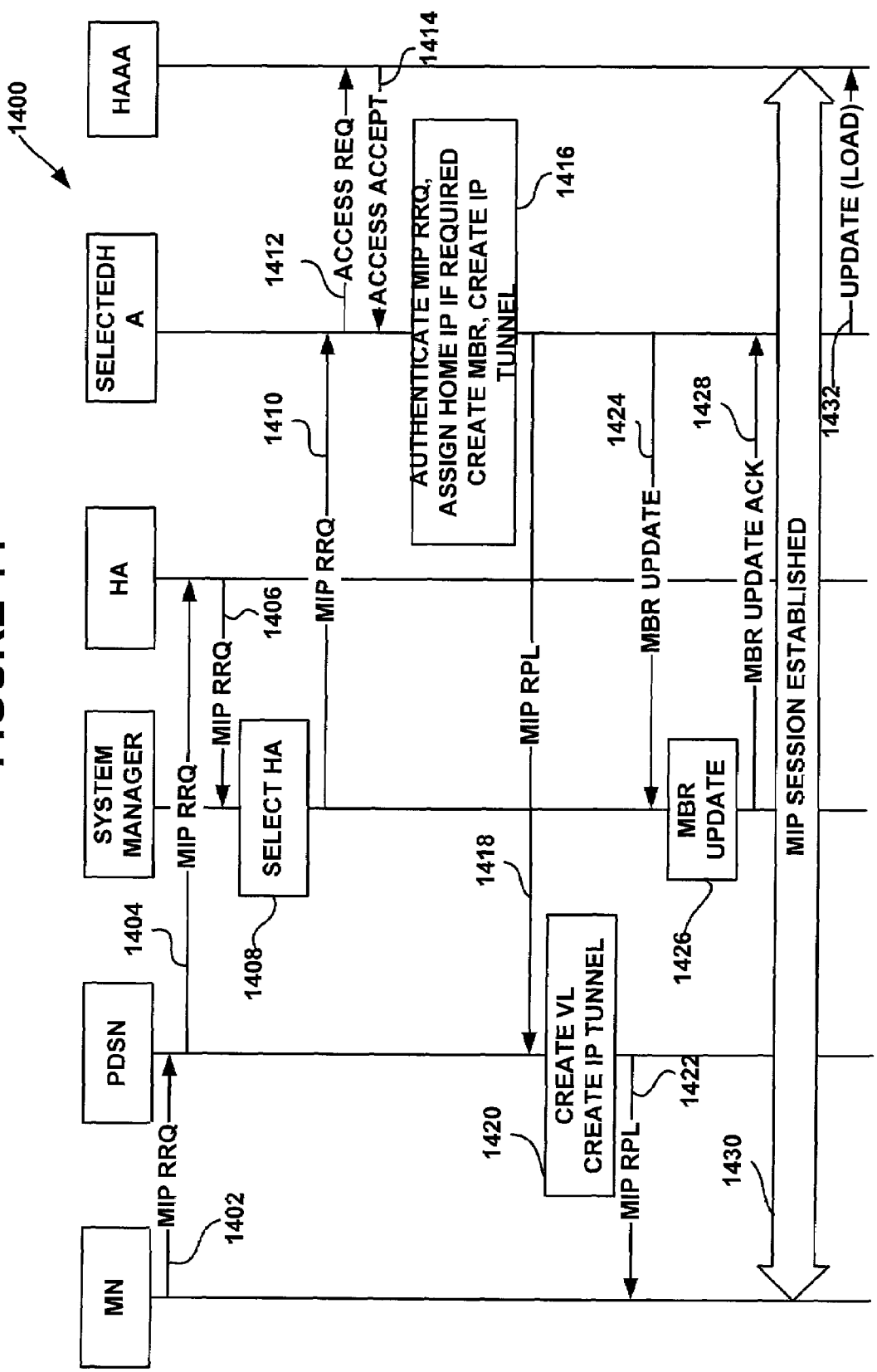
FIG. 14 is a block diagram of a message sequence scenario illustrating a HA registration process using a system manager according to one embodiment of the present invention.

FIG. 14 is a block diagram of a message sequence scenario 1400 illustrating a HA registration process in an embodiment, in which the system manager selects a new HA when an originating HA is unavailable. FIG. 14 illustrates a mobile node, a PDSN, a system manager, a HA, a selected HA, and a HAAA.

When the mobile node establishes a PPP session with the PDSN using one of the methods described in reference to FIGS. 12 and 13, the mobile node sends a MIP registration request message 1402 to the PDSN. In one embodiment, the registration request message 1402 may specify an IP address of a HA requested by the mobile node. Alternatively, the PDSN may contact a FAAA server to determine an IP address of a HA for the mobile node. The PDSN then forwards the registration request message to the HA, as illustrated at 1404. According to the embodiment illustrated in FIG. 14, the HA determines that it is unable to handle the call session due to the overload or near overload conditions, or because a static mobile node IP address proposed by the mobile node does not belong to the current HA's IP address pool, for instance. The HA communicate with the system manager to determine a network address of the alternative HA. For instance, as illustrated in FIG. 14, it is assumed that the HA does not participate in the distributed database scheme, and, thus, forwards the MIP registration request to the system manager, as illustrated at step 1406. It should be understood that a different message scheme could also be used to obtain an IP address of the alternative home agent.

When the system manager receives the registration request, the system manager selects a HA, as illustrated at 1408. Similarly to the selection of PDSNs, the system manager may apply a variety of algorithms to make the selection. For instance, the system manager may use prior records, load balancing factors, type/quality of service, or may take into consideration a number of sessions per HA, a session type, a session bitrate, a CPU load or a memory usage of each HA. Upon selecting the new HA, the system manager sends a MIP registration request message 1410 to the selected HA. Subsequently, the selected HA sends an access request message to a HAAA, and the HAAA replies with an access accept reply message 1414 upon authenticating the mobile node.

At step 1416, the selected HA authenticates the MIP registration request message and creates an MBR for the mobile node. Further, the selected HA starts negotiating and setting up an IP tunnel to the PDSN. Next, the selected HA sends a MIP registration reply message 1418 to the PDSN, and the home agent field in the MIP registration reply message 1418 includes the IP address of the selected HA. At step 1420, the PDSN creates the IP tunnel to the selected HA and a visitor list (VL) for the mobile node. The PDSN may create a VL for each mobile IP call, and each VL may include an IP address of the serving HA, an IP address of the mobile node, tunneling parameters, and authentication information.

At step 1422, the PDSN forwards the MIP reply message to the mobile node. At step 1424, the selected HA also sends an MBR update message 1424 to the system manager that then responds with an MBR update ACK message 1428 upon updating the MBR, as shown at step 1426. The MIP session is established as shown at step 1430. Further, at step 1432, the selected HA sends to the system manager an update message including its current load data.

Figure 15:
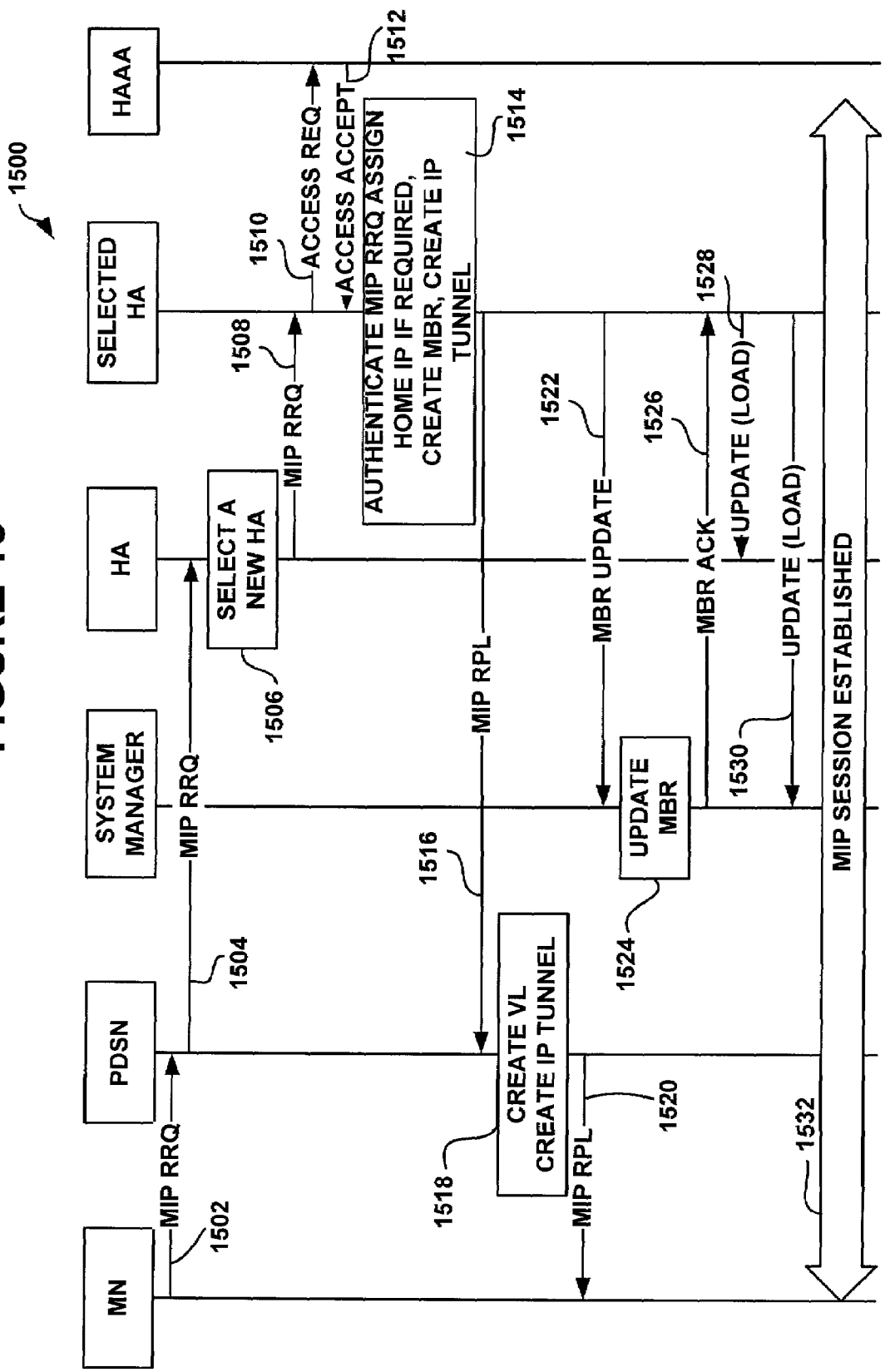
FIG. 15 is a block diagram of a message sequence scenario illustrating a HA registration process using a distributed information database mechanism according to one embodiment of the present invention.

FIG. 15 is a block diagram of a message sequence scenario illustrating a HA registration process, in which the HA participates in the distributed information database mechanism. In such an embodiment, each HA may be configured to determine a new HA if the HA is overloaded, for instance. Further, in such an embodiment, each participating HA may periodically receive from the system manager load update information of other participating HAs. Alternatively, the HA may receive the load information via IP multicasting from each participating HA. Similarly to FIG. 14, FIG. 15 illustrates a mobile node, a PDSN, a system manager, a HA, a selected HA, and a HAAA.

Upon establishing a PPP session to the PDSN, the mobile node sends a MIP registration request message 1502 to the PDSN. In one embodiment, the MIP registration request message may include an IP address of the HA requested by the mobile node. Alternatively, the PDSN may query a FAAA to determine a HA IP address for the mobile node. Next, the PDSN forwards the registration request message to the HA, as illustrated at step 1504.

When the HA receives the MIP registration request message 1504, the HA determines that it is unable to serve the request, and selects a new HA, as illustrated at step 1506. According to an exemplary embodiment illustrated in FIG. 15, the HA participates in the distributed information database, and, thus, has load information of other HAs participating in this scheme. The HA may select the new HA based on the same selection criteria that the system manager applies to select a new HA. Thus, the selection criteria may be based on the load of each HA, where the HA selects a HA having the lowest load, a type of session, a call data rate, or a type of service associated with a user, for instance. The HA then forwards the MIP registration request to the selected HA, as illustrated at step 1508.

Further, the selected HA may send an access request message to the HAAA that responds with an access accept message 1512. At step 1514, the selected HA authenticates the MIP registration request message, creates an MBR, and sets up an IP tunnel to the PDSN. At step 1516, the selected HA sends a MIP reply message to the PDSN that responsively creates a Visitor List (VL) for the mobile node and sets up the IP tunnel to the selected HA, as illustrated at 1518. At step 1520, the PDSN forwards the MIP registration reply message to the mobile node, and a MIP session is established, as illustrated at step 1532.

At step 1522, the selected HA sends an MBR update to the system manager that, at step 1524, updates the MBR and sends a MBR ACK message 1526. Further, at step 1528, the selected HA sends an update message to the HAs participating in the distributed database mechanism, and the update message includes the current updated load of the HA. FIG. 15 illustrates only one HA receiving the update message 1528. However, it should be understood that the HA may generate an IP multicast that is received by all participating HAs. Further, the update message is also received on the system manager, as illustrated at 1530. It should be understood that the HA may generate an exclusive message for the system manager or, alternatively, the IP address of the system manager may be included in the multicast group.

In addition to load balancing and otherwise selectively routing and re-routing the incoming communication sessions, the components of the control shelf and data shelf exhibit redundancy with failover capabilities. For instance, the control shelf illustrated and described in reference to FIG. 5 includes two shelf controllers 502 and 504, and two system managers 510 and 512. In such an embodiment, one of the system managers/shelf controllers may be configured as an active system manager/shelf controller, and the other one as a redundant (standby) system manager/shelf controller. Therefore, if the active unit fails, the redundant unit may detect the failure and take over the active role.

The standby system manager and shelf controller may perform heartbeat operations with their active partners to determine the non-availability of the active partner. A standby entity may send a Heartbeat Request message every time its heartbeat timer expires, and an active entity may respond with an acknowledgement message. If no acknowledgement message is received, the standby entity may assume that that the active entity is non-operational. Alternatively, based on the configuration, an active entity may resend a heartbeat, and if another response is not received, it may then assume that its partner is non-operational. Further, according to an exemplary embodiment, each member of a mated pair has a complete mirror image of its partner's data. For instance, each PDSN or HA may have two separate physical links with each system manager so that the active system manager and the backup system manager receive the same information simultaneously. Alternatively, the active system manager may receive updated load information from one or more PDSNs or HAs, and it may pass the received information to the standby system manager via the system data bus, for instance.

Further, each application module (PDSN/HA) may be arranged in a mated pair to provide 1 to 1 redundancy, and each PDSN in a pair of partners serves as a backup for the other. When a new session arrives at a PDSN, the PDSN sends all of the state information associated with the session to its partner. Similarly, session state information is also passed to the partner when the state changes. Thus, each member of a mated pair has a complete mirror image of its partner's session. According to an exemplary embodiment, the PDSNs/HAs may communicate over the switch egress modules or the internal buses. Further, the partner PDSN/HA may take over the session if the primary PDSN fails. According to one exemplary embodiment, the PDSNs/HAs may use a handoff method described in the co-pending patent application Ser. No. 10/041,436, "Smooth Handoff via State Exchange in Wireless Network," fully incorporated herein by reference.

It should be understood that a number of configuration schemes may be employed to achieve functional redundancy. For example, as mentioned above, two PDSNs/HAs may be paired and configured as primary and secondary (backup) PDSNs/HAs, and the primary PDSN/HA will handle all sessions until it is out of service. In such an embodiment, the backup PDSN/HA is a passive non-active backup that takes over the functionality of the primary PDSN/HA upon its failure. Further, the secondary or backup PDSN/HA receives a mirror image of all traffic that is received on the primary PDSN/HA over the internal media data bus, and the backup PDSN/HA does not have the ability to externally communicate data. In such an embodiment, all data exiting a backup application module on its external interfaces is dropped.

In the primary/backup configuration, the system manager monitors the activity status of all active cards in the shelf. To do that, the system manager may use a Simple Network Management Protocol ("SNMP"), fully described in the Internet Engineering Task Force ("IETF") Request For Comment ("RFC") 1157, and incorporated herein by reference. In one embodiment, the SNMP may be used to poll PDSNs/HAs that include Management Information Base ("MIBs"). Further, the system manager may use a Common Object Request Broker Architecture ("CORBA") based method to determine a status of each card. Using the SNMP, the system manager may detect the failure of the PDSN/HA if the failed PDSN/HA does not respond to SNMP polls. When the primary PDSN/HA fails, the system manager sends a message to the backup PDSN/HA, and the backup PDSN/HA acts as the primary PDSN/HA. Further, when the backup PDSN/HA takes over, it sends Address Resolution Protocol ("ARP") messages to the external routers so that the data is forwarded to the backup PDSN/HA and not the PDSN/HA that failed. Also when the primary PDSN/HA fails, the backup PDSN/HA uses the same external IP address as the primary card.

According to another exemplary embodiment for redundancy, two mated PDSNs/HAs may be active and handle communication sessions. In such an embodiment, the primary PDSN/HA sends data for only active communication sessions to the backup PDSN/HA via the media data bus, and when a session becomes dormant, the backup PDSN/HA removes the session information from its memory while the primary PDSN/HA still keeps it. In such an embodiment, memory requirement for supporting this kind of redundancy is minimized, and only active sessions are cached in the backup PDSN/HA for immediate switch-over in case of failure of the primary PDSN/HA. Further, the active card may only send control data for the active sessions to save data processing for backed up sessions. When a backup PDSN/HA takes over, the backup module (now a primary module) sends out ARP messages to external network entities and attaches the IP addresses of the failed card to its relevant network interfaces such as an R-P interface and a Pi interface, for instance.

Further, alternatively, instead of 1 to 1 redundancy, one application module (PDSN/HA) in the chassis may be assigned as a backup for all other application modules (PDSNs/HAs), thus, creating N to 1 redundancy. The N to 1 redundancy scheme may be desirable in communication systems, in which the majority of communication sessions are often dormant. Thus, for a system to be redundant and to avoid data and call loss, a backup module may be required for active sessions. In such an embodiment, the number of primary modules that may be backed up by a single backup module may be determined based on the amount of memory that is needed to back up the active session for N PDSNs/HAs.

In the N to 1 redundancy scheme, all active modules may send control and some data information that affect the state of a call to one backup module. When one or more of N PDSNs/HAs fail, the system manager may inform the backup module about the failed module, and the backup module provides network interfaces for the failed module.

Further, alternatively, an N to M redundancy scheme could also be used. The N to M redundancy can be achieved by having special purpose modules in the chassis/shelf that store only backup session information and are not used for call processing. In such an embodiment, the backup modules have enough memory to be able to cache both active and dormant sessions and only control information is mirrored to those modules. In such an embodiment, all application modules (PDSNs/HAs) that process call sessions send session information to the redundant modules as the sessions come up, during the state change of the sessions, or when the sessions disconnect, for instance. The redundant modules may arrange the received information for all active application modules. When an application module fails, the system manager may select a backup module from a pre-assigned list of M modules. The system manager may select the backup module based on a relative load of M modules. In such an embodiment, the selected backup module may have to transfer the session information for the failed module from one of the M modules that kept the information. For instance, instead of requesting all call session information, the backup module may request only active session information for a quick switch over, and later could get the dormant session information based on its load. Similarly to the redundancy schemes described in earlier paragraphs, the M backup modules may communicate via the internal media data bus. Further, the selected backup module may send ARP messages to external devices such as routers to assume network interfaces of the failed module.

It should be understood that the programs, processes, methods and systems described herein are not related or limited to any particular type of computer or network system (hardware or software), unless indicated otherwise. Various types of general purpose or specialized computer systems supporting the IP networking may be used with or perform operations in accordance with the teachings described herein.

In view of the wide variety of embodiments to which the principles of the present invention can be applied, it should be understood that the illustrated embodiments are examples only, and should not be taken as limiting the scope of the present invention. For example, the steps of the flow diagrams may be taken in sequences other than those described, more or fewer steps may be used, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed:

1. A method for packet data serving node selection in a mobile Internet Protocol network, the method comprising:

providing an access node comprising a plurality of packet data serving nodes and at least one system manager, the system manager having a load information database including a plurality of load records of the plurality of packet data serving nodes on the access node;

receiving from a radio node at a first packet data serving node of the plurality of packet data serving nodes a registration request to establish a communication session between the first packet data serving node and a mobile node;

determining that the first packet data serving node is unable to provide communication services to the mobile node;

sending a packet data serving node selection request from the first packet data serving node to a system manager on the access node;

determining at the system manager an address of a second packet data serving node based at least in part on the plurality of load records, the system manager further including a plurality of selection rules, and the system manager using at least one of the plurality of selection rules to determine the second packet data serving node;

generating a packet data serving node selection reply message at the system manager, wherein the packet data serving node selection reply message comprises the address of the second packet data serving node;

receiving the packet data serving node selection reply message at the first packet data serving node;

sending a registration reply message from the first packet data serving node to the radio node, wherein the registration reply message comprises a registration rejection and the address of the second packet data serving node; and establishing a communication session between the mobile node and the second packet data serving node.

2. The method of claim 1, wherein establishing a communication session between the mobile node and the second packet data serving node comprises:

sending a registration request message from the radio node to the second packet data serving node;

allocating resources on the second packet data serving node for the mobile node; and sending a registration reply message from the second packet data serving node to the radio network node.

3. The method of claim 2, further comprising:

sending a load update message from the second packet data serving node to the system manager; and updating a load information record associated with the second packet data serving node on the system manager.

4. The method of claim 1, wherein the system manager comprises a mobile node record associated with the mobile node, wherein the mobile node record comprises the address of the second packet data serving node specified as a last serving packet data serving node that provided communication services to the mobile node, and wherein the system manager selects the second packet data serving node based on the mobile node record.

5. A method for packet data serving node selection in a mobile Internet Protocol network, the method comprising:

providing an access node comprising a plurality of packet data serving nodes and a system manager;

establishing a distributed load information database of the plurality of packet data serving nodes via the system manager by:

generating a load information update message on each packet data serving node, and sending the load information update message to the plurality of packet data serving nodes;

replicating the load information database on the plurality of packet data serving nodes;

receiving from a radio node at a first packet data serving node on the access node a registration request to establish a communication session between the first packet data serving node and a mobile node;

determining on the first packet data serving node an address of a second packet data serving node at the access node using at least a load information database on the first packet data serving node;

sending a registration response message from the first packet data serving node to the radio node, the registration response message comprising the address of the second packet data serving node; and establishing a communication session between the mobile node and the second packet data serving node.

6. The method of claim 5, wherein establishing a communication session between the mobile node and the second packet data serving node comprises:

receiving a registration request from the radio node on the second packet data serving node to establish the communication session between the mobile node and the second packet data serving node;

allocating resources to serve the mobile node; and sending a registration reply message from the second packet data serving node to the radio node.

7. The method of claim 5, wherein the first packet data serving node further comprises a plurality of selection rules for selecting packet data serving nodes, and determining the second packet data serving node further comprises using at least one of the plurality of selection rules to select the second packet data serving node.

8. The method of claim 5, wherein determining on the first packet data serving node an address of a second packet data serving node comprises selecting the second packet data serving node specified as a last packet data serving node that served the mobile node.

9. An access node for selecting a packet data serving node for a mobile node, the access node comprising:

a plurality of packet data serving nodes, each of the plurality of packet data serving nodes having load information of at least one of the plurality of packet data serving nodes, each packet data serving node configured to receive from a radio node a registration request message associated with a mobile node, the registration request including a session rate requested from the mobile node, and, if a first packet data serving node receiving the registration request is unable to provide communication services to the mobile node, the first packet data serving node is configured to determine a second packet data serving node at the access node to service the registration request based on at least load information of the second packet data serving node and further based on the requested session rate, and further the first packet data serving node is configured to generate and send to the radio node a registration reply message including an address of the second packet data serving node;

a system manager communicating with the plurality of packet data serving nodes, the system manager configured to receive load information from the plurality of packet data serving nodes, wherein the system manager comprises a mobile node record including the address of the second packet data serving node specified as a last serving packet data serving node; and wherein the first packet data serving node determines the second packet data serving node by sending a packet data serving node selection request to the system manager, and the system manager selects the second packet data serving node to serve the registration request, and sends to the first packet data serving node a packet data serving node selection reply comprising an address of the second packet data serving node.

10. The access node of claim 9, wherein the system manager is further configured to establish a heartbeat mechanism between the system manager and each of the plurality of packet data serving nodes.

11. An access node for assigning a packet data serving node to mobile node, the access node comprising:
at least one shelf controller card;
a plurality of packet data serving node cards;
a switch egress card;
a system control bus for connecting each shelf controller card to the plurality of packet data serving node cards and the switch egress card;
a media data bus for connecting the switch egress card to at least the plurality of packet data serving node cards;
each of the plurality of packet data serving node cards having an ingress port and an egress port for communicating data to and from a communication network;
a first packet data serving node card of the plurality of packet data serving node cards configured to receive via an ingress port from a radio node a registration request message associated with the mobile node, and determine a network address of a second packet data serving node card to serve a registration request specified in the registration request message, the first packet data serving node card further configured to send via an egress port to the radio node a registration reply message including the network address of the second packet data serving node; and
a system manager card configured to:
receive load information from the plurality of packet data serving node cards via the media data bus;
receive the selection request message; and
determine the network address of the second packet data serving node card using a plurality of selection rules available on the system manager card;
wherein, to determine the network address of the second packet data serving node, the first packet data serving node card is configured to send via the system manager bus to the system manager card a selection request message and then receive via the system manager bus from the system manager a selection reply message comprising the network address of the second packet data serving node card.

12. The access node of claim 11, wherein the first packet data serving node card is further configured to send the selection request message and receive the selection reply message via the system control bus.

13. A method for providing packet data serving node redundancy, the method comprising:
providing an access node comprising a plurality of packet data serving nodes and at least one system manager;
assigning a partner packet data serving node to at least one packet data serving node;
providing communication session information from the at least one active packet data serving node to the standby packet data serving node, wherein the communication session information is associated with at least one active communication session being served on the at least one active packet data serving node;
storing the communication session information on the standby packet data serving node;
establishing a monitoring mechanism between the at least one system manager and the at least one active packet data serving node;
detecting a failure of one of the at least one active packet data serving node;
determining at the at least one system manager a standby packet data serving node for the at least one active packet data serving node;
switching communication sessions from the at least one active packet data serving node that failed to the standby packet data serving node by switching the at least one active communication session from the active packet data serving node that failed to the standby packet data serving node;
receiving a state change for the at least one active communication session from the one of the at least one active packet data serving node on the standby packet data serving node, wherein one of the at least one active communications session becomes dormant; and
deleting on the standby packet data serving node communication session information associated with the dormant communication session.

14. The method of claim 13, wherein the communication session information being received at the standby packet data serving node comprises communication session information associated with at least one dormant communication session.

15. The method of claim 13, wherein the communication session information is further associated with at least one dormant communication session and at least one active communication session being served on the at least one active packet data serving node.

16. A method for packet data serving node redundancy with failover capabilities, the method comprising:
providing a plurality of packet data serving nodes on an access node comprising a system manager, wherein the plurality of packet data serving nodes comprises a plurality of active packet data serving node and a plurality of standby packet data serving nodes, and wherein each of the plurality of active packet data serving nodes is assigned to one standby packet data serving node;
providing communication session information from the plurality of active packet data serving nodes to the at least one standby packet data serving node;
detecting a failure of one of the plurality of active packet data serving nodes;
determining one of the at least one standby packet data serving node to serve communication sessions of the one of the plurality of packet data serving nodes that failed;
triggering the selected standby packet data serving node to serve the communication sessions;
receiving on each standby packet data serving node communication session information associated with active communication session on each respective active packet data serving node;
receiving on a respective standby packet data serving node a session state change indication for a communication session on one of the plurality of standby packet data serving nodes; and
deleting communication session information associated with the communication session on the respective standby packet data serving node.

17. The method of claim 16, further comprising:
receiving on each standby packet data serving node communication session information associated with dormant communication sessions on each respective active packet data serving node.

18. The method of claim 16, wherein at least one of the plurality of standby packet data serving nodes is configured as an inactive packet data serving node until a trigger is received to serve the communication sessions.

19. The method of claim 16, wherein at least one of the plurality of standby packet data serving nodes is configured to serve incoming communication session and serves as an inactive packet data serving node.

20. The method of claim 16, wherein communication session information of the plurality of active packet data serving nodes is distributed over the plurality of standby packet data serving node, and the method further comprises:
responsive to detecting a failure of one of the plurality of active packet data serving nodes, selecting one of the plurality of standby packet data serving nodes to serve communication sessions of the active packet data serving node that failed;
providing communication session information of active communication sessions of the active packet data serving node that failed to the selected standby packet data serving node; and
serving the active communication session on the selected standby packet data serving node.

21. The method of claim 20, further comprising:
providing communication session information of dormant communication session associated with the active packet data serving node that failed to the selected standby packet data serving node.

* * * * *